(12) United States Patent
Maercovich

(10) Patent No.: US 9,057,452 B2
(45) Date of Patent: Jun. 16, 2015

(54) MOTORIZED AUTOMATE/MANUAL PUSH BUTTON SYSTEM

(76) Inventor: Jorge Maercovich, Chatsworth, CA (US)

( * ) Notice: Subject to any disclaimer, the term of this patent is extended or adjusted under 35 U.S.C. 154(b) by 127 days.

(21) Appl. No.: 13/385,857

(22) Filed: Mar. 8, 2012

(65) Prior Publication Data

US 2012/0167990 A1 Jul. 5, 2012

Related U.S. Application Data

(63) Continuation-in-part of application No. 13/136,645, filed on Aug. 5, 2011, now Pat. No. 8,596,607, which is a continuation of application No. 12/220,231, filed on Jul. 22, 2008, now Pat. No. 8,016,262.

(51) Int. Cl.

| | | |
|---|---|---|
| *F16K 31/05* | (2006.01) | |
| *E03D 3/06* | (2006.01) | |
| *E03D 5/10* | (2006.01) | |
| *F16K 31/385* | (2006.01) | |
| *F16K 31/40* | (2006.01) | |

(52) U.S. Cl.
CPC . *F16K 31/05* (2013.01); *E03D 3/06* (2013.01); *E03D 5/10* (2013.01); *F16K 31/3855* (2013.01); *F16K 31/404* (2013.01)

(58) Field of Classification Search
CPC ....... F16K 31/3855; F16K 31/05; E03D 5/10; E03D 3/06; E03D 3/12
USPC ........... 251/38, 40, 129.03, 129.11, 41; 4/249
See application file for complete search history.

(56) References Cited

U.S. PATENT DOCUMENTS

| | | | | |
|---|---|---|---|---|
| 2,038,135 | A * | 4/1936 | Sloan | 251/21 |
| 2,620,826 | A * | 12/1952 | Otto | 251/40 |
| 2,633,141 | A * | 3/1953 | Russell | 137/49 |
| 2,635,691 | A * | 4/1953 | Filliung | 137/624.18 |
| 2,738,946 | A * | 3/1956 | Filliung | 251/35 |
| 3,406,940 | A * | 10/1968 | Kertell | 251/40 |
| 6,757,919 | B2 * | 7/2004 | Snyder | 4/406 |
| 7,063,103 | B2 * | 6/2006 | Guler et al. | 137/269 |
| 7,185,876 | B2 * | 3/2007 | Jost | 251/129.04 |
| 7,367,541 | B2 * | 5/2008 | Muderlak et al. | 251/129.04 |
| 8,317,155 | B2 * | 11/2012 | Maercovich | 251/40 |
| 8,397,317 | B2 * | 3/2013 | Funari et al. | 4/249 |
| 8,561,225 | B2 * | 10/2013 | Wilson et al. | 4/661 |
| 2004/0026640 | A1 * | 2/2004 | Enomoto et al. | 251/40 |
| 2010/0024895 | A1 * | 2/2010 | Parsons et al. | 137/15.18 |
| 2011/0083260 | A1 * | 4/2011 | Maercovich | 4/324 |

* cited by examiner

*Primary Examiner* — Matthew W Jellett
(74) *Attorney, Agent, or Firm* — Ramond Y. Chan; David and Raymond Patent Firm

(57) ABSTRACT

A driving mechanism, mounting to a flush apparatus, includes an actuation housing coupling with a valve body, a manual actuation unit including a push button and a manual plunger arm transversely extended from the push button towards a pushing platform, and an automated actuation unit including a motorized unit and an automated plunger arm transversely extended towards the pushing platform. When the push button is manually pressed, the pushing platform is pushed by the manual plunger arm to move a diaphragm member at the unsealed position. When the motorized unit is activated in responsive to a presence of a user, the automated plunger arm is driven by the motorized unit to move towards the pushing platform, such that the pushing platform is pushed by the automated plunger arm to move the diaphragm member at the unsealed position.

1 Claim, 18 Drawing Sheets

MOTORIZED AUTOMATE/MANUAL PUSH BUTTON SYSTEM

CROSS REFERENCE OF RELATED APPLICATION

This application is a Continuation-In-Part application that claims the benefit of priority under 35USC119(e) of earlier filed non-provisional application having an application Ser. No. 13/136,645 and a filing date Aug. 5, 2011 now U.S. Pat. No. 8,596,607, which is a Continuation application having an application Ser. No. 12/220,231 and a filing date of Jul. 22, 2008 now U.S. Pat. No. 8,016,262.

BACKGROUND OF THE PRESENT INVENTION

1. Field of Invention

The present invention relates to a flush apparatus, and more particularly to a motorized automate/manual push button system, which is adapted for incorporating with the flush apparatus to selectively actuate the flush apparatus automatically by a motorized device in responsive to a presence of a user and manually by an actuation of a push button.

2. Description of Related Arts

A conventional manual flush apparatus for a sanitary system comprises a valve body, a water valve, and a manual operation mechanism. The valve body has a water inlet communicating with a water source, a water outlet for the water flushing out of the valve body, and a manual handle opening communicating with the manual operation mechanism. The water valve comprises a diaphragm member sealing between the water inlet and the water outlet, and a diaphragm shaft downwardly extended from the diaphragm member to move the diaphragm member between a sealed position and an unsealed position.

The manual operation mechanism comprises a driving unit, a retention ring coupled with the valve body at the manual handle opening to hold the driving unit thereat, and a manual handle movably mounted at the retention ring via a ball joint. The driving unit comprises a dish-shaped pushing platform disposed in the retention ring and a plunger pin extended from the pushing platform towards the diaphragm shaft through the manual handle opening. When the manual handle is manually moved through an arc-path from its first position to push the pushing platform, the plunger pin is laterally moved to push a bottom portion of the diaphragm shaft in a tilted manner, thereby unsealing the diaphragm member to let the water flushing out of the water outlet and thus flushing the sanitary system.

The main advantage of the manual flush apparatus is that the manual operation of the manual operation mechanism is accurate and simple. Accordingly, since the pushing platform provides a relatively large pushing surface for the manual handle, the pushing platform can transmit the pushing force at any direction from the manual handle to a lateral pushing force at the plunger pin. In other words, no matter which contacting point at the pushing surface of the pushing platform is hit by the manual handle, the plunger pin will always laterally move to push the diaphragm shaft. Therefore, the user can move the manual handle at any direction for completing the flushing operation of the manual flush apparatus.

For hygiene purposes, an improved flush apparatus provides an automated operation mechanism for flushing the sanitary system in a hand free manner. The automated operation mechanism comprises a solenoid operated pusher for utilizing a latching solenoid to limit power drain on the battery. Accordingly, when an infrared sensor detects the presence of a user of the sanitary system, the solenoid operated pusher is automatically driven to move the diaphragm shaft for flushing the sanitary system. However, the automated operation mechanism has several common drawbacks.

The presence of the user sensed by the infrared sensor will cause the solenoid to move the diaphragm member to the unsealed position. It is known that the solenoid is made of a number of circular wire loops to generate a magnetic force when an electric current is passed through the wire loops. The solenoid may come in contact with water such that the solenoid may accumulate rusting particles from the water, which may remain on the solenoid. It is one of the common problems to cause a failure of operation of the automated operation mechanism. In other words, the conventional manual operation mechanism is more reliable than the automated operation mechanism. Thus, the maintenance cost of the automated operation mechanism is higher than that of the conventional manual operation mechanism.

In addition, the structural design of the automated operation mechanism is different from that of the manual operation mechanism. In other words, when the flush apparatus is incorporated with the automated operation mechanism, the flush apparatus will lose the mechanical-manual operated feature. Therefore, there is no alternative to flush the sanitary system when the automated operation mechanism has failed to operate.

The solenoid operated pusher is retracted by a spring force. Accordingly, a compression spring is coaxially mounted at the solenoid operated pusher and arranged in such a manner that when the solenoid operated pusher is pushed forward to move the diaphragm shaft, the compressed spring will apply the spring force to push the solenoid operated pusher back to its original position. Accordingly, the spring will gradually generate a weak spring force after a period of continuous use.

In order to install the automated operation mechanism into the conventional flush apparatus, the manual operation mechanism of the flush apparatus must be totally removed, which is a waste of resources in order to incorporate with the automated operation mechanism. In other words, the driving unit, the retention ring, and the manual handle must be disassembled from the flush apparatus in order to install the automated operation mechanism.

Furthermore, the solenoid must be electrically linked to a power source. The solenoid can be electrically linked with an external AC power source that an electric cable must be properly run from the external power source to the solenoid. Alternatively, the solenoid can be powered by a battery that the battery must be frequently replaced before the solenoid is out of battery.

SUMMARY OF THE PRESENT INVENTION

A main object of the present invention is to provide a motorized automate/manual push button system for a flush apparatus, which is a driving mechanism adapted for incorporating with the flush apparatus to selectively actuate the flush apparatus automatically by a motorized device in responsive to a presence of a user and manually by an actuation of a push button.

Another object of the present invention is to provide a driving mechanism, which is adapted for coupling with the conventional flush apparatus by only detaching the manual handle. In other words, the driving mechanism is adapted to maximize the use of the components of the conventional flush apparatus.

Another object of the present invention is to provide a driving mechanism, which is adapted to mount at the retention ring and to actuate the driving unit of the conventional manual operation mechanism. Therefore, the present invention will provide an accurate and simple flush operation as the manual flush apparatus provides.

Another object of the present invention is to provide a driving mechanism, wherein the manual plunger arm is transversely extended from the push button to the pushing platform of the driving unit such that when the push button is pressed, the pushing platform is pushed at its pushing surface to laterally move the plunger pin as it is operated by the manual handle. Likewise, the automated manual plunger arm is moved to push at the pushing platform of the driving unit to laterally move the plunger pin as it is operated by the manual handle. In other words, both manual and automated operations of the driving mechanism provide a simulated manual operation of the conventional manual flush apparatus.

Another object of the present invention is to provide a driving mechanism, wherein the automated plunger arm is automatically driven by a motorized unit in a lateral direction that the automated plunger arm is laterally moved towards the diaphragm shaft and is laterally moved back from the diaphragm shaft. Therefore, no spring force is applied at the automated plunger arm to retract the automated plunger arm back to its original position.

Another object of the present invention is to provide a driving mechanism, wherein the automated plunger arm has a hollow structure that the manual plunger arm is slidably received in the automated plunger. Therefore, the manual and automated plunger arms are correspondingly provided the lateral movement towards the pushing platform.

Another object of the present invention is to provide a driving mechanism, wherein the power source of the motorized unit is automatically re-charged via a charging device every time during the flushing operation of the flush apparatus.

Another object of the present invention is to provide a driving mechanism, wherein the motorized unit is used as a replacement of the solenoid to control a flow of water, so as to enhance the reliable of the operation of the driving mechanism in comparison with the conventional solenoid mechanism. Thus, the motorized unit avoids water damage and to enhance performance and reliability.

Another object of the present invention is to provide a driving mechanism, which does not require to alter the original structural design of the flush apparatus, so as to minimize the manufacturing cost of the flush apparatus incorporating with the driving mechanism.

Another object of the present invention is to provide a driving mechanism, wherein no expensive or complicated structure is required to employ in the present invention in order to achieve the above mentioned objects. Therefore, the present invention successfully provides an economic and efficient solution for not only providing a selection of manual/automated flush operation for the flush apparatus but also providing an accurate and simple flush operation as the manual flush apparatus does.

Accordingly, in order to accomplish the above objects, the present invention provides a flush apparatus, comprising:

a valve body having a water inlet and a water outlet;

a water valve comprising a diaphragm member sealing between the water inlet and the water outlet, and a diaphragm shaft extended from the diaphragm member to move the diaphragm member between a sealed position and an unsealed position; and an operation device comprising a driving unit and a retention ring coupled with the valve body, wherein the driving unit comprises a pushing platform movably disposed in the retention ring and a plunger pin extended from the pushing platform towards the diaphragm shaft.

The flush apparatus further comprises a driving mechanism, which comprises:

an actuation housing having an actuation channel coupling with the retention ring;

a manual actuation unit which comprises a push button movably mounted at the actuation housing and a manual plunger arm transversely extended along the actuation channel from the push button towards the pushing platform, wherein when the push button is manually pressed, the pushing platform is pushed by the manual plunger arm to move the diaphragm member at the unsealed position; and an automated actuation unit which comprises a motorized unit received in the actuation housing and an automated plunger arm transversely extended along the actuation channel, wherein when the motorized unit is activated in responsive to a presence of a user, the automated plunger arm is driven by the motorized unit to move towards the pushing platform, such that the pushing platform is pushed by the automated plunger arm to move the diaphragm member at the unsealed position.

These and other objectives, features, and advantages of the present invention will become apparent from the following detailed description, the accompanying drawings, and the appended claims.

DETAILED DESCRIPTION OF THE PREFERRED EMBODIMENT

Figure 1:
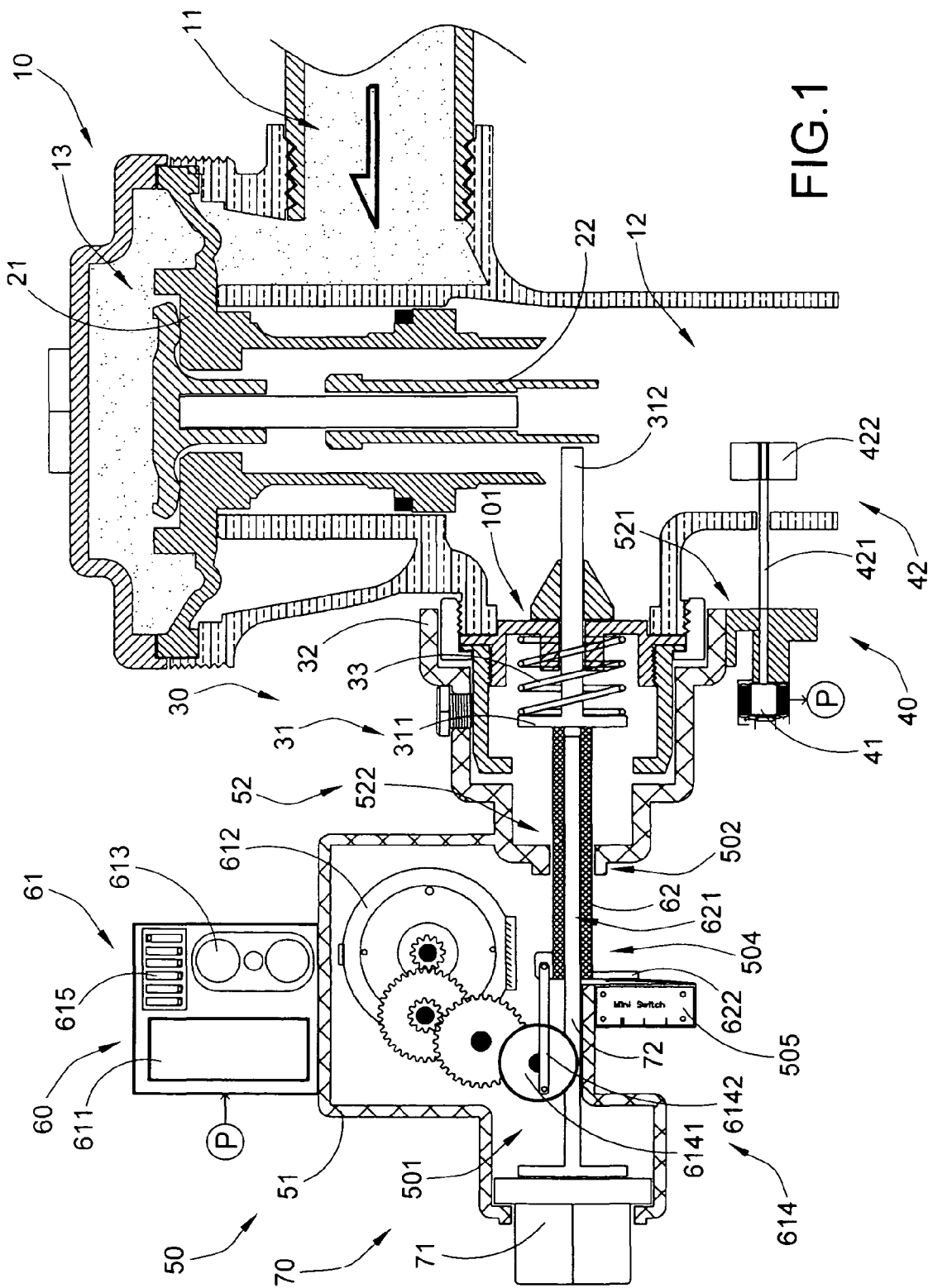
FIG. 1 is a sectional view of a flush apparatus with a driving mechanism according to a first preferred embodiment of the present invention.
Figure 2:
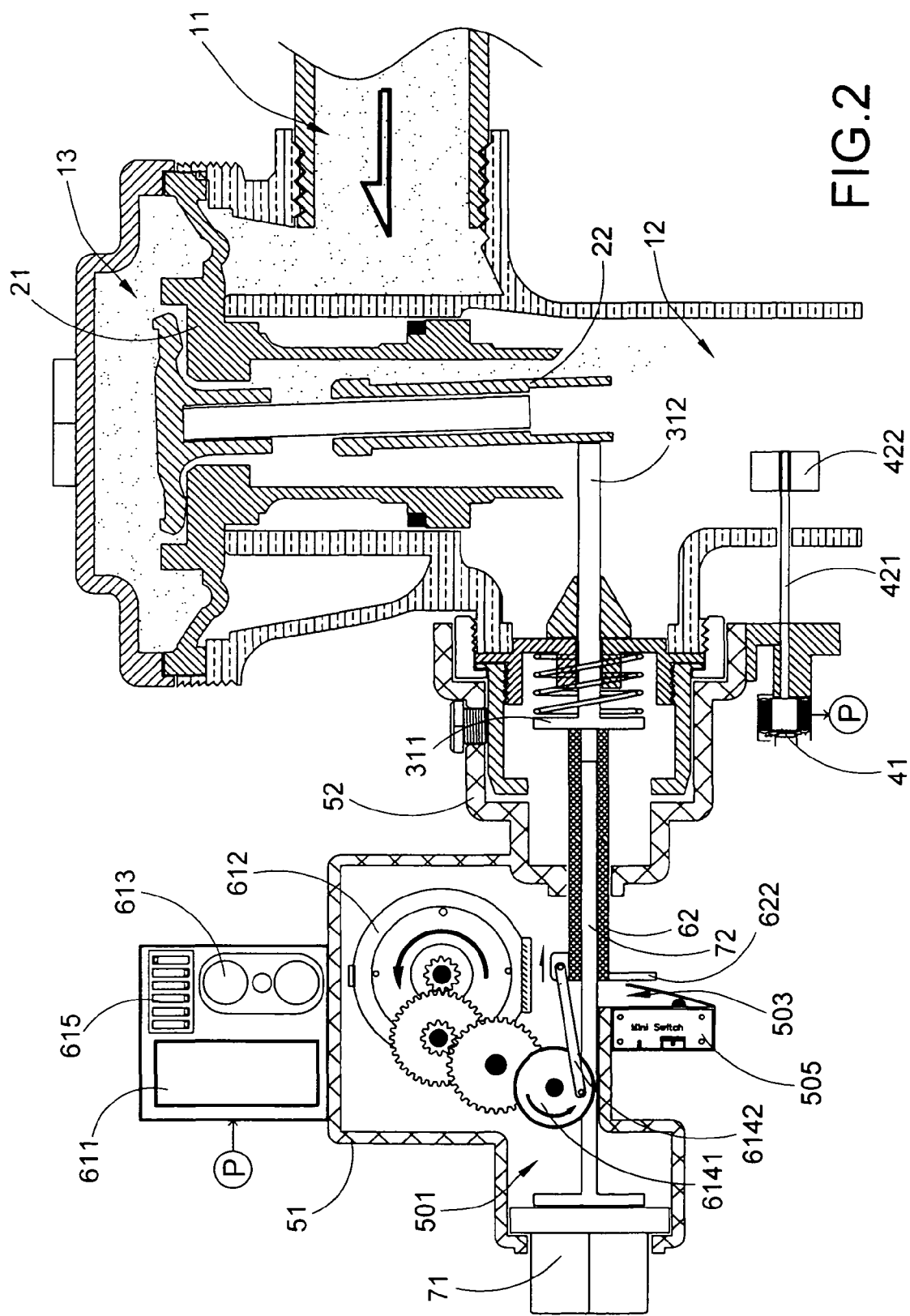
FIG. 2 is a sectional view of the flush apparatus according to the above first preferred embodiment of the present invention, illustrating the automatic plunger arm being actuated.
Figure 3:
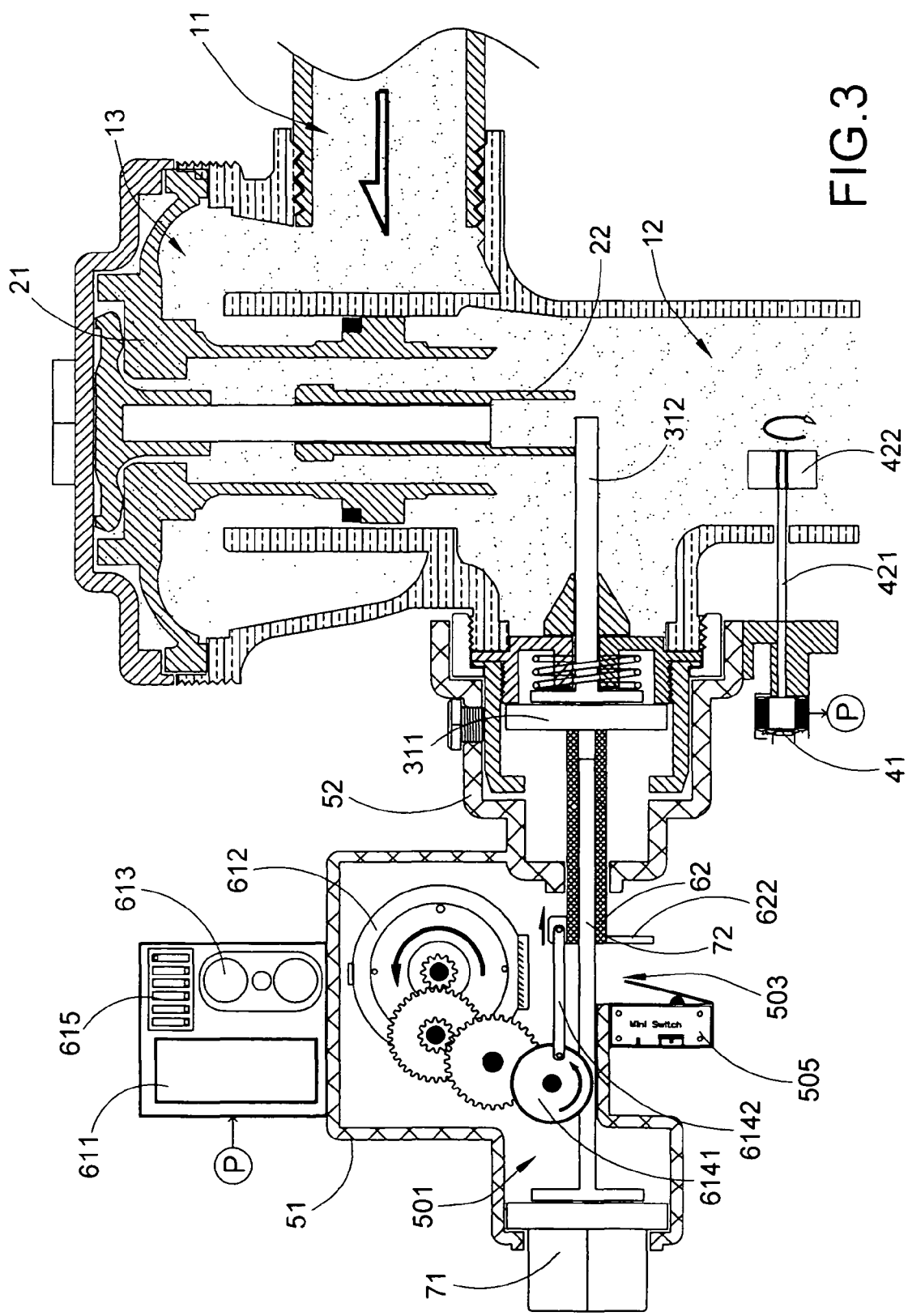
FIG. 3 is a sectional view of the flush apparatus according to the above first preferred embodiment of the present invention, illustrating the diaphragm member returning back to the sealed position.

Referring to FIGS. 1 to 3 of the drawings, a flush apparatus according to a first preferred embodiment of the present invention is illustrated, wherein the flush apparatus, such as a conventional manual flush apparatus for a sanitary system, comprises a valve body 10, a water valve 20 and an operation device 30.

The valve body 10 has a water inlet 11 communicatively linked to a water source, a water outlet 12, and a water chamber 13 provided between the water inlet 11 and the water outlet 13.

The water valve 20 comprises a diaphragm member 21 sealing at the water chamber 13 between the water inlet 11 and the water outlet 12, and a diaphragm shaft 22 extended from the diaphragm member 21 to move the diaphragm member 21 between a sealed position and an unsealed position. Accordingly, at the sealed position, the diaphragm member 21 is sealed at the water chamber 13 via the water pressure inside the valve body 10 to block the water flowing from the water inlet 11 to the water outlet 12. At the unsealed position, the diaphragm member 21 is moved by the diaphragm shaft 22 to allow the water passing from the water inlet 11 to the water outlet 12, thereby flushing the sanitary system.

The operation device 30 comprises a driving unit 31 and a retention ring 32 coupled with the valve body 10 at an operation opening 101 thereof, wherein the driving unit 31 comprises a pushing platform 311 movably disposed in the retention ring 32 and a plunger pin 312 extended from the pushing platform 311 towards the diaphragm shaft 22. Therefore, when the pushing platform 311 is pushed towards the diaphragm shaft 22, the plunger pin 312 is driven to hit a bottom portion of the diaphragm shaft 22 so as to move the diaphragm member 21 from the sealed position to the unsealed position. The operation device 30 further comprises a spring 33 supported in the retention ring 32 for applying an urging force against the pushing platform 311 to push the plunger pin 312 back to its original position after the plunger pin 312 is laterally moved toward the diaphragm shaft 22. It is worth to mention that the pushing platform 311 will only be slid within the retention ring 32 and will be blocked at the surrounding edge of the operation opening 101 of the valve body 10 to prevent the further forward sliding movement of the pushing platform 311. In other words, the pushing platform 311 will not be slid into the valve body 10 through the operation opening 101.

It is worth to mention that when the operation device 30 incorporates with a manual handle as the conventional manual flush apparatus, the manual handle is actuated to push the pushing platform 311 at a pushing surface thereof towards diaphragm shaft 22 so as to move the diaphragm member 21 from the sealed position to the unsealed position.

According to the preferred embodiment, the flush apparatus further comprises a driving mechanism incorporating with the operation device 30, wherein the driving mechanism comprises an actuation housing 50 and an automated actuation unit 60.

The actuation housing 50, having an actuation channel 501, is coupling with the valve body 10. Accordingly, the actuation housing 50 is mounted at the valve body 10 through the retention ring 32 such that the actuation housing 50 is positioned adjacent to the valve body 10. As shown in FIG. 1, the actuation housing 50 comprises a housing body 51 defining the actuation channel 501 at a bottom portion thereof and a tubular mounting ring 52 encirclingly mounting at the retention ring 32 to align the actuation channel 501 with the pushing platform 311.

The automated actuation unit 60 is received in the housing body 51 at a position above the actuation channel 501, wherein the automated actuation unit 60 comprises a motorized unit 61 received in the housing body 51 of the actuation housing 50 and an automated plunger arm 62 transversely extended along the actuation channel 501. Accordingly, the motorized unit 61 is received in the housing body 51 at a position above the actuation channel 501. When the motorized unit 61 is activated in responsive to a presence of a user, the automated plunger arm 62 is driven by the motorized unit 61 to move towards the pushing platform 311, such that the pushing platform 311 is pushed by the automated plunger arm 62 to move the diaphragm member 21 at the unsealed position, as shown in FIG. 2. Accordingly, the diaphragm member 21 is then moved pack to its sealed position as shown in FIG. 3.

As shown in FIG. 1, the motorized unit 61 comprises a power source 611, a servo unit 612 electrically coupled with the power source 611, a sensor 613 controllably activating the servo unit 612 in responsive to a presence of the user, and a gear transmission unit 614 coupling the servo unit 612 with the automated plunger arm 62 to transmit a servo power from the servo unit 612 to a transverse force at the automated plunger arm 62 so as to drive the automated plunger arm 62 towards the pushing platform 311.

According to the preferred embodiment, the power source 611 is a rechargeable battery supported in the housing body 51. Alternatively, the power source 611 can be a power outlet electrically linking with an external AC power supply or a solar energy collector for converting solar energy into electrical energy to supply the power to the servo unit 612.

The servo unit 612, according to the preferred embodiment, comprises an electric motor electrically connected to the power source 611, wherein the servo unit 612 is actuated to drive the automated plunger arm 62 to move laterally. It is worth to mention that the electric motor is more reliable than the solenoid because the electric motor provides simple mechanical work rather than using the magnetic force, so as to minimize the failure operation of the servo unit 612 and to reduce the maintenance cost of the present invention. In addition, the size of the electric motor is so small in comparison with the solenoid so as to reduce the overall size of the actuation housing 40 to house the automated actuation unit 60 of the present invention. Therefore, the electric motor is preferred to be used to not only ensure the reliable of the automated actuation unit 60 but also enhance the smooth operation thereof.

The sensor 613, such as an infrared sensor, is arranged to detect the presence of the user by means of infrared signal in such a manner that when the sensor 613 transmits an infrared signal for detecting the presence of the user of the sanitary system, the sensor 613 activates the servo unit 612 to actuate the automated plunger arm 42 to push the pushing platform 311 forward so as to move the diaphragm member 21 of the unsealed position. Accordingly, the housing body 51 has a transparent window aligned with the sensor 613 for allowing the infrared signal sending out through the transparent window. It is worth to mention that the sensor 613 activates the servo unit 612 to stop the automated plunger arm 62 once the operation of the flush apparatus is completed.

Accordingly, a CPU 615 is operatively connected to the sensor 613 to receive the signal therefrom, wherein the servo unit 612 is controlled by the CPU 615 such that once the CPU 615 receives the signal from the sensor 613, the CPU 615 will activate the servo unit 612 to drive the automatic plunger arm 62 for completing the automatic operation. It is worth to mention that the CPU 615 can be programmed to the time period of the presence of the user via the sensor 613 and to control the flush volume of the water via the automated actuation unit 60 by means of the time period of the opening of the diaphragm member 21 at the unsealed position.

The gear transmission unit 614 comprises a gear set 6141 coupling with an output of the servo unit 612 and a driving arm 6142 having one end rotatably coupling with the gear set 6141 and an opposed end pivotally coupling with the automated plunger arm 62 in such a manner that when the servo unit 612 is activated, the automated plunger arm 62 is driven to laterally move in a reciprocating manner.

As shown in FIGS. 2 and 3, the corresponding end of the driving arm 6142 is rotatably coupled with one gear of the gear set 6141, wherein when the corresponding gear is rotated, the automated plunger arm 62 is driven to laterally move in a reciprocating manner. Accordingly, when the corresponding gear is rotated in a half revolution, the automated plunger arm 62 is laterally moved forward to push the pushing platform 311 at a position that the diaphragm member 21 is moved at the unsealed position. When the corresponding gear is rotated in one full revolution, the automated plunger arm 62 is laterally moved backward at a position that the diaphragm member 21 is moved back to the sealed position. Therefore, the automated plunger arm 62 is driven to laterally move in a reciprocating manner via the rotation of the gear set 6141. It is worth to mention that the time of the automated plunger arm 62 traveling back and forth can be controlled by the rotational speed of the gear set 6141. In addition, the automated plunger arm 62 is laterally pulled back by the driving arm 6142 after the pushing platform 311 is pushed forward so as to ensure the automated plunger arm 62 returning back to its original position once the flush operation is completed.

As shown in FIG. 1, the driving mechanism further comprises a manual actuation unit 70 which is received in the housing body 51 of the actuation housing 50. The manual actuation unit 70 comprises a push button 71 movably mounted at the housing body 51 of the actuation housing 50 and a manual plunger arm 72 transversely extended along the actuation channel 501 from the push button 71 towards the pushing platform 311. When the push button 71 is manually pressed, the pushing platform 311 is pushed by the manual plunger arm 72 to move the diaphragm member 21 at the unsealed position.

According to the preferred embodiment, the actuation housing 50 has a button slot provided at a sidewall thereof for the push button 71 slidably mounted at the button slot. The push button 71 is aligned with the pushing platform 311 through the actuation channel 501 such that when the push button 71 is manually pressed, the pushing platform 311 is directly pushed in a lateral direction through the manual plunger arm 72.

As shown in FIG. 1, the manual plunger arm 72 has an enlarged pressing end extended to bias against the push button 71 and an opposed pusher end extended towards the pushing platform 311 through the actuation channel 501 in such a manner that when the push button 71 is manually pressed, the manual plunger arm 72 is directly pushed towards the pushing platform 311.

In order to correspondingly guide the lateral movement between the automated plunger arm 62 and the manual plunger arm 72, the automated plunger arm 62 has a hollow structure defining a sliding channel 621 that the manual plunger arm 72 is slidably extended through the sliding channel 621. Therefore, at the manual flush operation, the automated plunger arm 62 will guide the sliding movement of the manual plunger arm 72 when the automated plunger arm 62 is stationary. Likewise, at the automated flush operation, the manual plunger arm 72 will guide the sliding movement of the automated plunger arm 62 when the manual plunger arm 72 is stationary.

Figure 7:
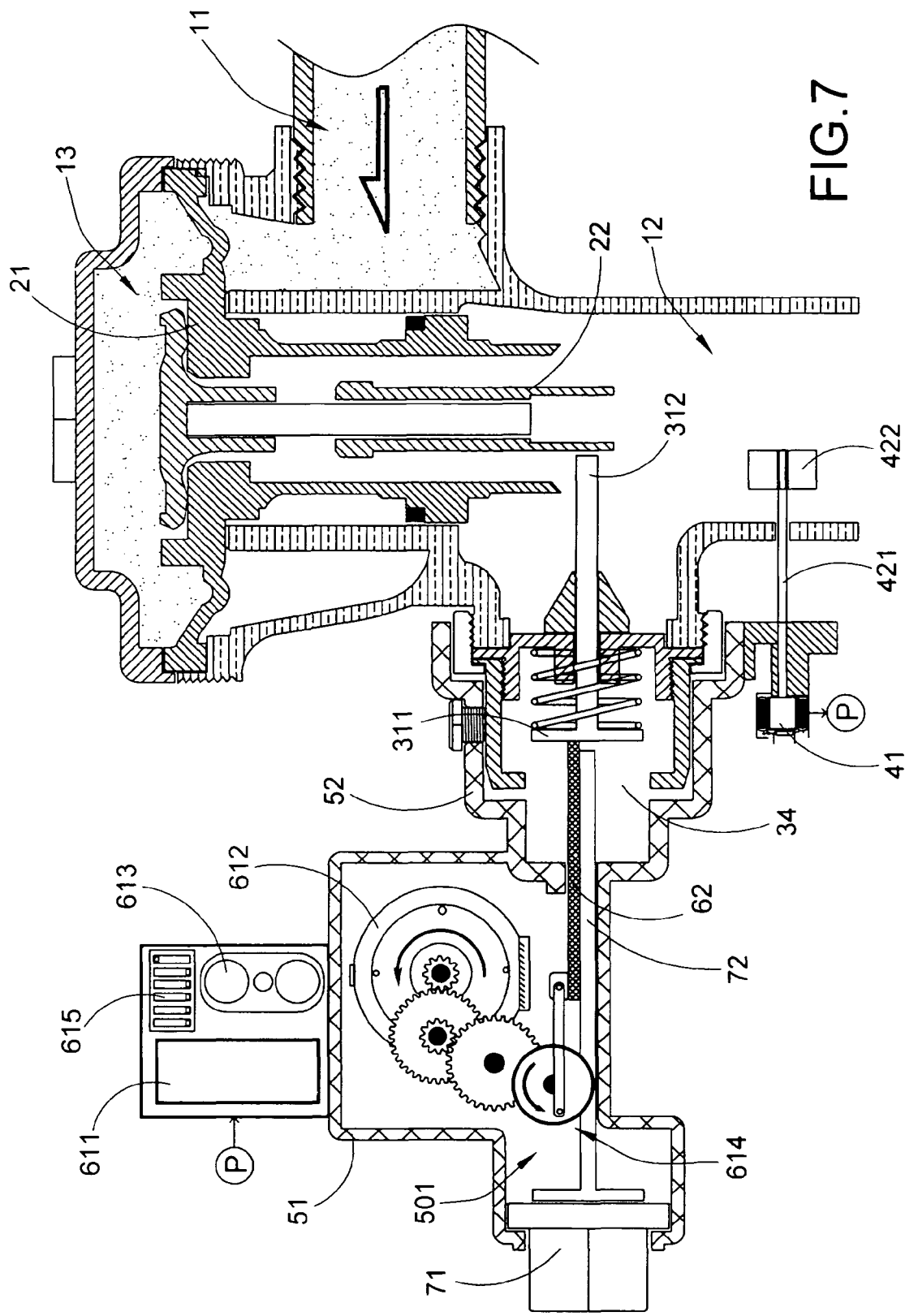
FIG. 7 illustrates an alternative mode of the driving mechanism, illustrating the automatic plunger arm and the manual plunger arm being extended side-by-side.

As shown in FIG. 7, the automated plunger arm 62 and the manual plunger arm 72 can be two individual pins extending side by side to push the pushing platform 311. However, two guiders should be included to guide the sliding movement of each of the automated plunger arm 62 and the manual plunger arm 72.

As shown in FIGS. 1 to 3, the automated plunger arm 62 comprises a sliding stopper 622 protruded outwardly, wherein when the automated plunger arm 62 is laterally moved forward, the sliding stopper 622 is blocked by a first stopper 502 of the housing body 51 so as to stop the further forward movement of the automated plunger arm 62. When the automated plunger arm 62 is laterally moved backward, the sliding stopper 622 is blocked by a second stopper 503 of the housing body 51 so as to ensure the automated plunger arm 62 returning back to its original position. Accordingly, the housing body 51 has a guiding slot 504 provided at a bottom wall of the actuation channel 501, wherein the sliding stopper 622 is downwardly extended from the automated plunger arm to slidably engage with the guiding slot 504. The two ends of the guiding slot 504 form the first and second stoppers 502, 503 respectively, such that the traveling distance of the automated plunger arm 62 is limited by the length of the guiding slot 502 between the two ends thereof.

Accordingly, a contact switch 505 is provided at the housing body 51 at the second stopper 503 and arranged in such a manner that when the sliding stopper 622 is slid along the guiding slot 504 at the second stopper 503, the sliding stopper 622 contacts with the contact switch 505 to generate a stopping signal so as to deactivate the servo unit 612.

As shown in FIG. 1, the mounting ring 52 has an enlarged mounting opening 521 encirclingly mounting at the retention ring 32 and an opposed guiding opening 522 aligning with the actuation channel 501. The automated plunger arm 62 is extended through the guiding opening 522 of the mounting ring 52 to push the pushing platform 311. As it is mentioned above, the manual plunger arm 72 is coaxially coupled with the automated plunger arm 62 such that the automated plunger arm 62 and the manual plunger arm 72 are slidably extended through the guiding opening 522 of the mounting ring 52. In other words, the guiding opening 522 of the mounting ring 52 not only provides a support for the automated plunger arm 62 and the manual plunger arm 72 within the actuation channel 501 but only ensures the correct alignment of the automated plunger arm 62 and the manual plunger arm 72 to push the pushing platform 311.

According to the preferred embodiment, the driving mechanism further comprises a power charging arrangement 40 for charging the power source 611 every time during the flush operation, including both automated flush operation and manual flush operation. The power charging arrangement 40 comprises an electrical generator 41 operatively linked to the power source 611 and a propeller unit 42 extended from the electrical generator 41 to the water outlet 12 of the valve body 10 in such a manner that when the propeller unit 42 is driven to rotate in responsive to a flush of water coming out at the water outlet 12, the electrical generator 41 is actuated to charge the power source 611.

The electrical generator 41, according to the preferred embodiment, is an alternator or a DC generator converting mechanical energy (rotational force) of the propeller unit 42 to the electrical energy. Accordingly, a rectifier can be used to convert AC current to DC current if the alternator is used.

As shown in FIG. 1, the propeller unit 42 comprises a propeller shaft 421 transversely extended with respect to the actuation channel 501 and a propeller blade 422 coupled at a free end of the propeller shaft 421 at the water outlet 12 such that the propeller blade 422 is driven to be rotated in responsive to a flush of water so as to transmit a rotational power to the electrical generator 41 through the propeller shaft 421.

Accordingly, during the flush operation, the diaphragm member 21 is moved at the unsealed position by the diaphragm shaft 22 to allow the water passing from the water inlet 11 to the water outlet 12, thereby flushing the sanitary system. When the water flushes out at the water outlet 12, the flush power of the water will drive the propeller blade 422 to rotate. In other words, the propeller blade 422 provides a torque to the propeller shaft 421 during the water flushing movement at the water outlet 12. The electrical generator 41, which is an induction device, comprises a coil body encircling with a magnet such that when the propeller unit 42 generates the rotational force, the electrical generator 41 will convert the rotational force into an electrical force for charging the power source 611.

The propeller unit 42 translates water flush energy to the rotational torque directly related to the total blade area, i.e. more blades equal more torque. Multiple propeller blades 422 contain a greater surface area on the propeller blades 422 allowing a small diameter propeller size to be effective.

As shown in FIG. 1, the propeller shaft 421 is extended parallel to each of the manual and automated plunger arms 62, 72. Accordingly, the power charging arrangement 40 can be an add-on device externally coupled with the valve body 10. It is worth to mention that the propeller shaft 421, which is made of rigid and durable material, has a relatively small size in diameter. Even though the propeller shaft 421 is extended from the housing body 51 to the water outlet 12 of the valve body 10, the flush operation of the flush apparatus will not be affected. It is appreciated that the power charging arrangement 40 can be an integrated device that the propeller unit 42 is extended through the actuation channel 501 to support the propeller blade 422 at the water outlet 12.

In order to mount the driving mechanism to the valve body 10 which is the conventional manual flush apparatus, the user is able to remove the manual handle from the retention ring 32 only. Then, by mounting the mounting opening 522 of the mounting ring 52 at the retention ring 32, the actuation housing 60 is supported adjacent to the valve body. The installation of the driving mechanism is completed. Therefore, the user is able to selectively operation the flush apparatus manually by pressing the push button 71 or automatically by detecting the presence of the user via the sensor 612. It is worth to mention that both manual and automated flush operation via the driving mechanism of the present invention act like the conventional manual flush operation by pushing the pushing platform 311 to move the diaphragm member 21 at the unsealed position through the diaphragm shaft 22. Therefore, the present invention provides an accurate, reliable, and simple manual/automated flush operation as the manual flush apparatus provides.

Figure 4:
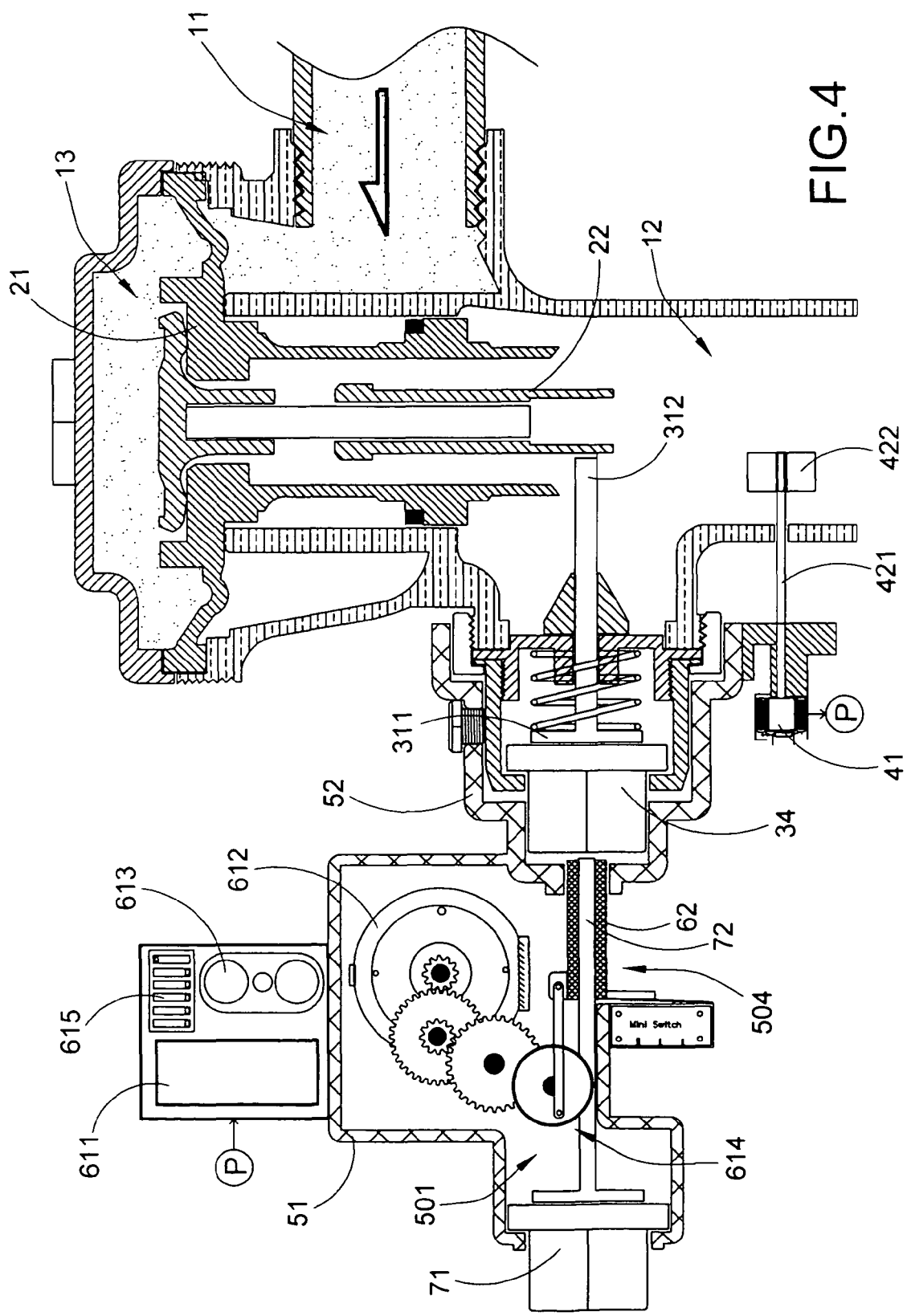
FIG. 4 illustrates the driving mechanism incorporating with an alternative mode of the button-type flush apparatus according to the above first preferred embodiment of the present invention.
Figure 5:
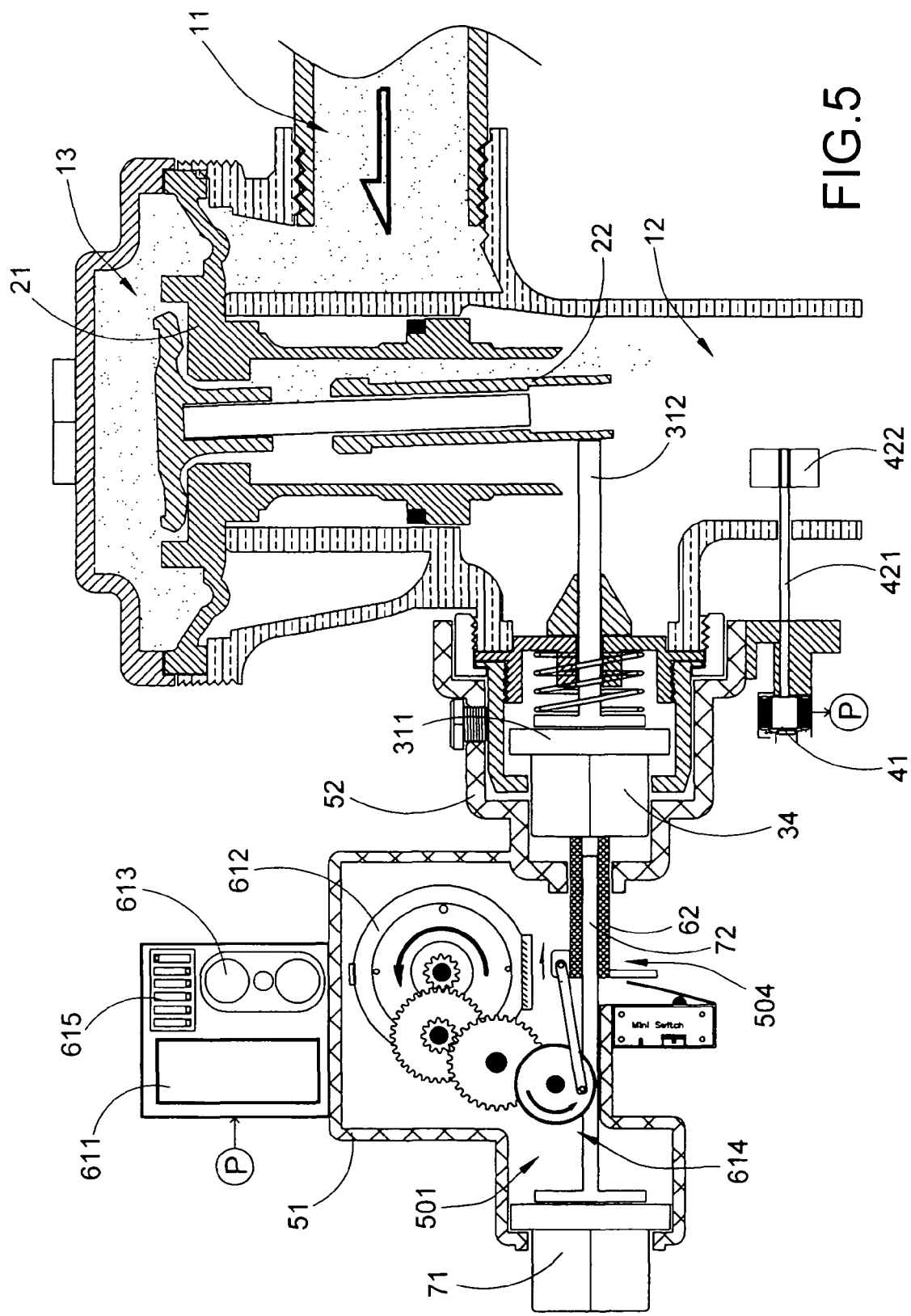
FIG. 5 illustrates the automatic plunger arm being actuated to move the diaphragm member of the alternative flush apparatus to its unsealed position according to the above first preferred embodiment of the present invention.
Figure 6:
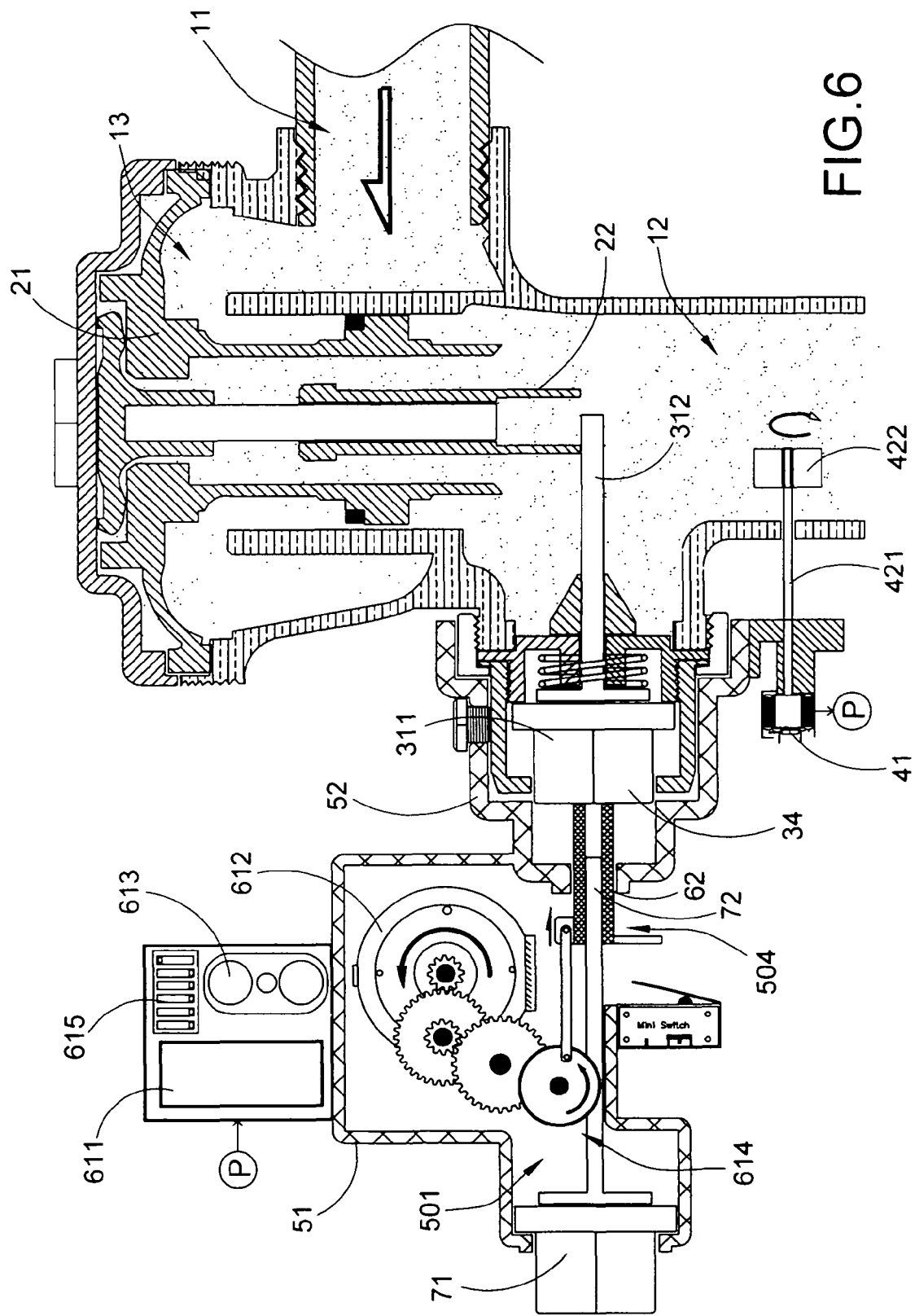
FIG. 6 illustrates the diaphragm member of the alternative flush apparatus returning back to the sealed position according to the above first preferred embodiment of the present invention.

FIGS. 4 to 6 illustrates alternative mode of the driving mechanism incorporating with the button-type conventional manual flush apparatus. As it is mentioned above, the handle type conventional manual flush apparatus is that the manual handle is actuated to push the pushing platform 311 at the pushing surface thereof towards diaphragm shaft 22 so as to move the diaphragm member 21 from the sealed position to the unsealed position. Accordingly, the button-type conventional manual flush apparatus is that operation device 30 further comprises a manual depressible button 34 coupling with the pushing platform 311 of the driving unit 31. Therefore, when the manual depressible button 34 is manually depressed, the pushing platform 311 is pushed by the manual depressible button 34 at the pushing surface thereof towards diaphragm shaft 22 so as to move the diaphragm member 21 from the sealed position to the unsealed position.

The driving mechanism of the present invention is adapted to incorporate with both the handle type conventional manual flush apparatus, as shown in FIGS. 1 to 3, and the button-type conventional manual flush apparatus, as shown in FIGS. 4 to 6. As shown in FIG. 4, the automated plunger arm 62 and the manual plunger arm 72 are slidably extended to the manual depressible button 34. Therefore, for manual operation, the manual plunger arm 72 is actuated to push at the manual depressible button 34. For automatic operation, the automated plunger arm 62 is actuated to push at the manual depressible button 34. In other words, both the manual and automatic operations for the handle type conventional manual flush apparatus are the same as the manual and automatic operations for the button-type conventional manual flush apparatus.

It is worth to mention that the operator must replace the manual handle from the handle type conventional manual flush apparatus in order to install the driving mechanism of the present invention. For the button-type conventional manual flush apparatus, the operator does not require to replace any part of the button-type conventional manual flush apparatus, i.e. keeping the manual depressible button 34, in order to install the driving mechanism of the present invention.

Figure 8:
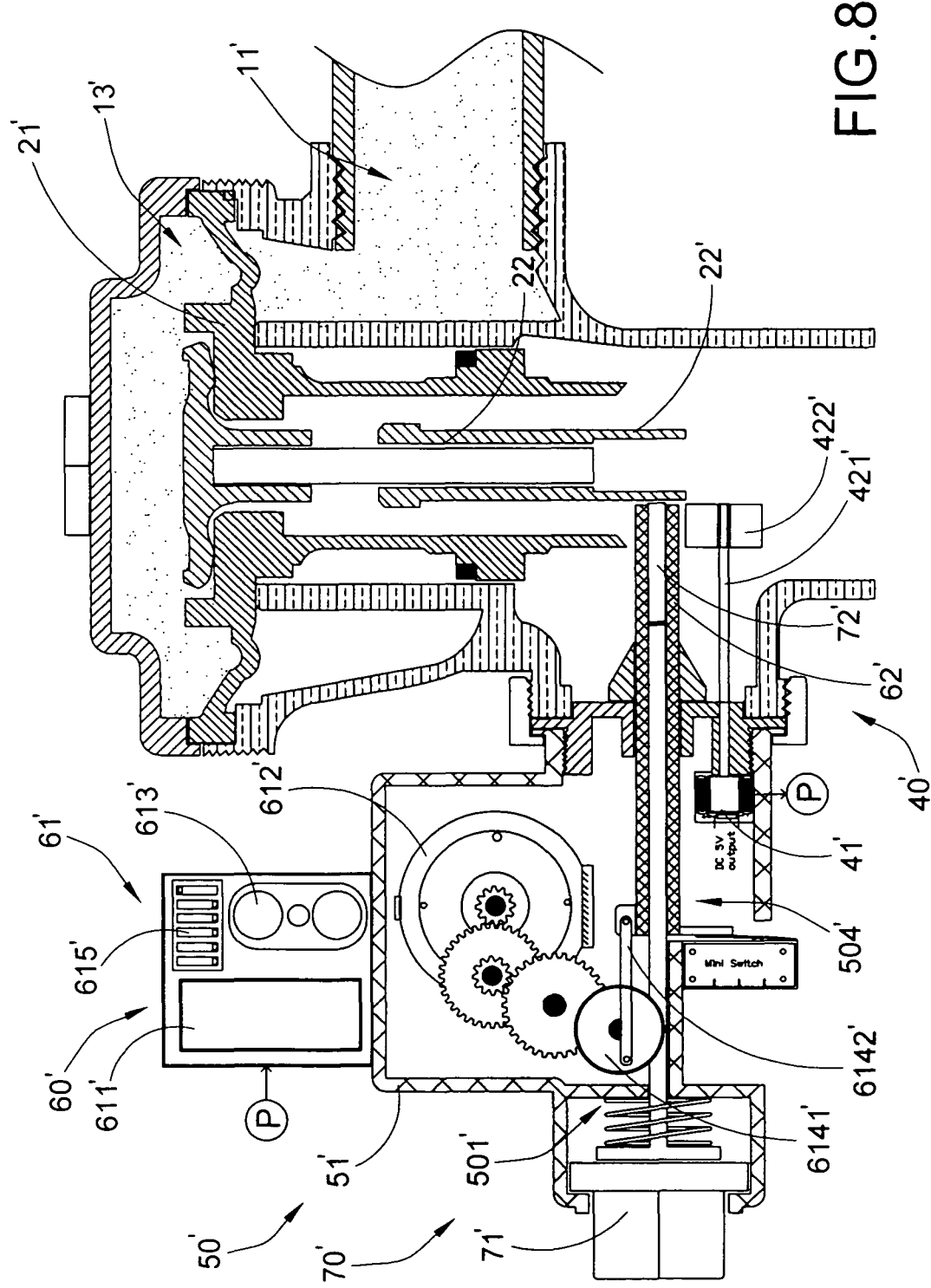
FIG. 8 is a sectional view of a flush apparatus with a driving mechanism according to a second preferred embodiment of the present invention.
Figure 9:
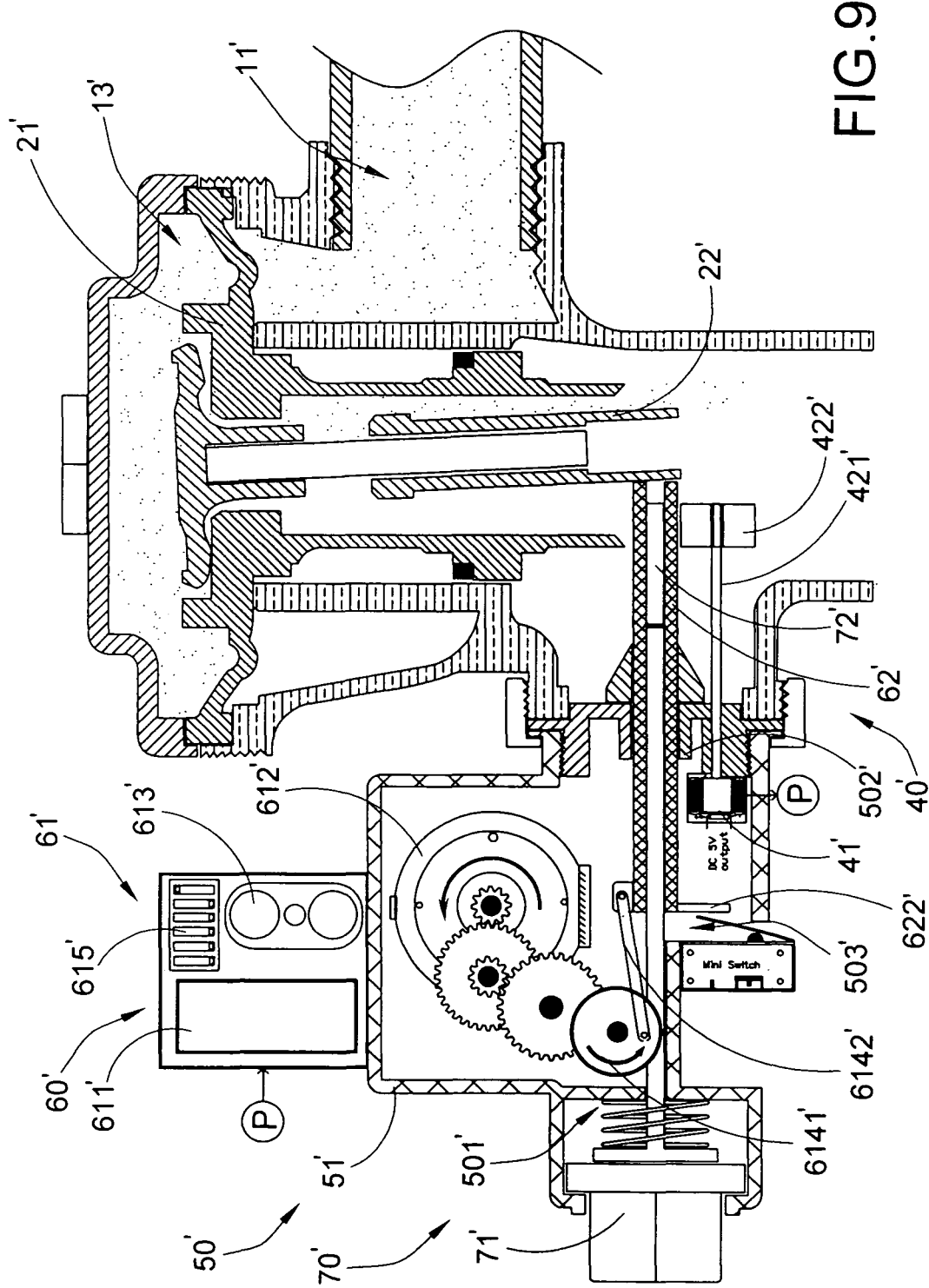
FIG. 9 is a sectional view of the flush apparatus according to the above second preferred embodiment of the present invention, illustrating the automatic plunger arm being actuated.
Figure 10:
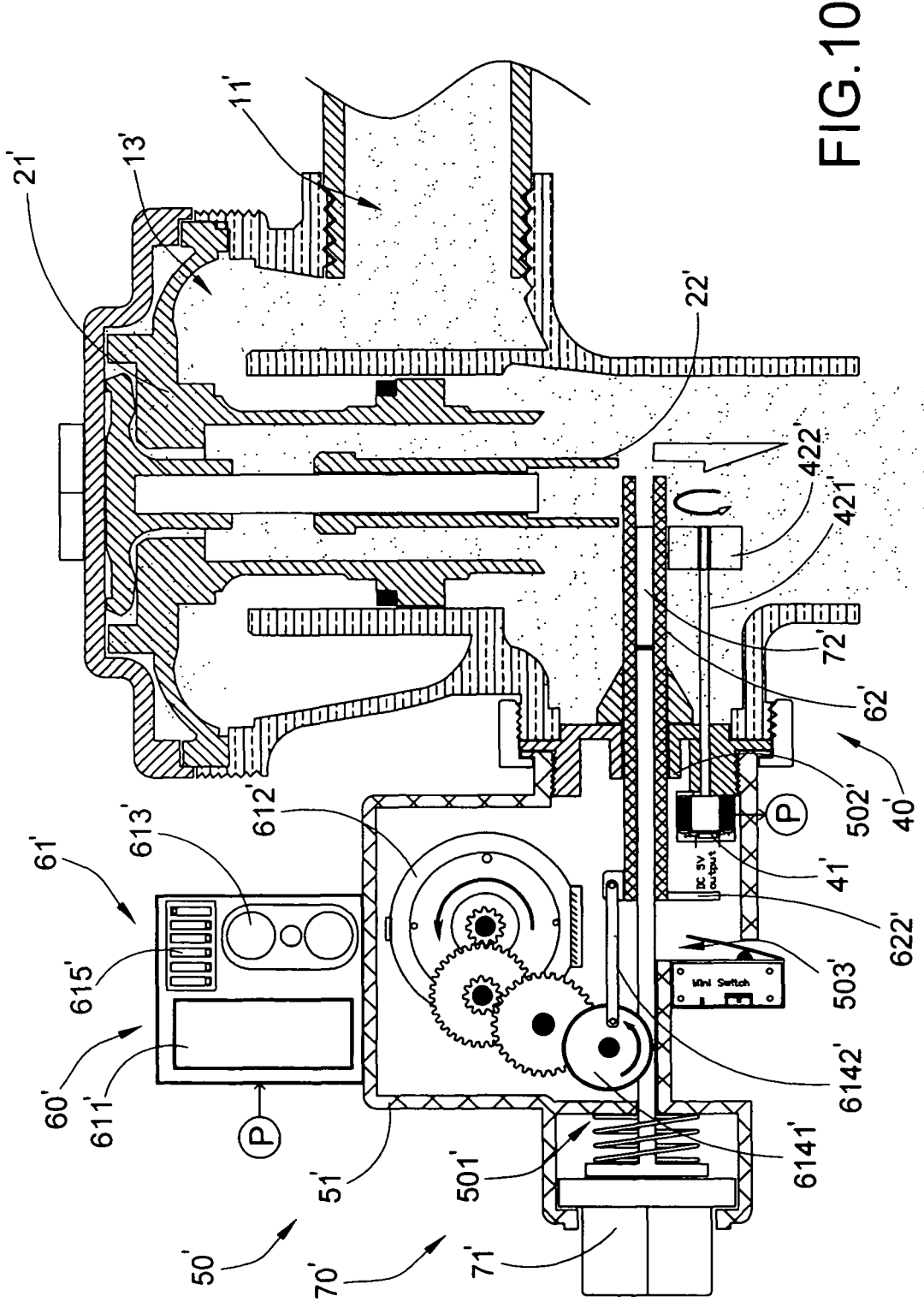
FIG. 10 is a sectional view of the flush apparatus according to the above second preferred embodiment of the present invention, illustrating the diaphragm member returning back to the sealed position.

As shown in FIGS. 8 to 10, a flush apparatus of a second preferred embodiment illustrates an alternative mode of the first embodiment, wherein the flush apparatus of the second preferred embodiment has the same configuration except the operation device 30 shown in the first embodiment.

According to the second embodiment, the driving mechanism comprises an actuation housing 50', an automated actuation unit 60', a manual actuation unit 70', and power charging arrangement 40'.

The actuation housing 50', having an actuation channel 501', is supported by the valve body 10. Accordingly, the actuation housing 50' is mounted at the valve body 10 at a position that the actuation housing 50' is positioned adjacent to the valve body 10. As shown in FIG. 8, the actuation housing 50' comprises a housing body 51' defining the actuation channel 501' at a bottom portion thereof and a tubular mounting element 52' mounting at said valve body to align the actuation channel 501' with the diaphragm shaft 22'. Accordingly, the actuation channel 501' is transversely extended to communicate with the bottom portion of the diaphragm shaft 22'.

The automated actuation unit 60' is received in the housing body 51' at a position above the actuation channel 501', wherein the automated actuation unit 60' comprises a motorized unit 61' received in the housing body 51' of the actuation housing 50' and an automated plunger arm 62' transversely extended along the actuation channel 501. When the motorized unit 61' is activated in responsive to a presence of a user, the automated plunger arm 62' is driven by the motorized unit 61' to move towards the diaphragm shaft 22', such that the diaphragm shaft 22' is pushed by the automated plunger arm 62' to move the diaphragm member 21' at the unsealed position, as shown in FIG. 9. Accordingly, the diaphragm member 21' is then moved back to its sealed position as shown in FIG. 10.

As shown in FIG. 8, the motorized unit 61' comprises a power source 611', a servo unit 612' electrically coupled with the power source 611', a sensor 613' controllably activating the servo unit 612' in responsive to a presence of the user, and a gear transmission unit 614' coupling the servo unit 612' with the automated plunger arm 62' to transmit a servo power from the servo unit 612' to a transverse force at the automated plunger arm 62' so as to drive the automated plunger arm 62' towards the diaphragm shaft 22.

According to the second embodiment, the power source 611' is a rechargeable battery supported in the housing body 51'. The servo unit 612' comprises an electric motor electrically connected to the power source 611'. The sensor 613' is an infrared sensor to detect the presence of the user by means of infrared signal. The gear transmission unit 614' comprises a gear set 6141' coupling with an output of the servo unit 612' and a driving arm 6142' driving the automated plunger arm 62' to laterally move in a reciprocating manner.

A CPU 615' is operatively connected to the sensor 613' to receive the signal therefrom, wherein the servo unit 612' is controlled by the CPU 615' such that once the CPU 615' receives the signal from the sensor 613', the CPU 615' will activate the servo unit 612' to drive the automatic plunger arm 62' for completing the automatic operation. It is worth to mention that the CPU 615' can be programmed to the time period of the presence of the user via the sensor 613' and to control the flush volume of the water via the automated actuation unit 60' by means of the time period of the opening of the diaphragm member 21' at the unsealed position.

The automated plunger arm 62' comprises a sliding stopper 622' blocked by a first stopper 502' of the housing body 51' to stop the further forward movement of the automated plunger arm 62' and blocked by a second stopper 503' of the housing body 51' to ensure the automated plunger arm 62' returning back to its original position. Accordingly, the housing body 51' has a guiding slot 504' provided at a bottom wall of the actuation channel 501', wherein the sliding stopper 622' is downwardly extended from the automated plunger arm 62' to slidably engage with the guiding slot 504'. The two ends of the guiding slot 504' form the first and second stoppers 502', 503' respectively, such that the traveling distance of the automated plunger arm 62' is limited by the length of the guiding slot 502' between the two ends thereof.

In other words, the automated actuation unit 60' of the second embodiment has the same configuration of the first embodiment, except that the automated plunger arm 62' of the second embodiment is extended to the diaphragm shaft 22' while the automated plunger arm 62 of the first embodiment is extended to the pushing platform 311.

The manual actuation unit 70' is received in the housing body 51' of the actuation housing 50'. The manual actuation unit 70' comprises a push button 71' movably mounted at the housing body 51' of the actuation housing 50' and a manual plunger arm 72' transversely extended along the actuation channel 501' from the push button 71' towards the diaphragm shaft 22'. When the push button 71' is manually pressed, the diaphragm shaft 22' is pushed by the manual plunger arm 72' to move the diaphragm member 21' at the unsealed position.

The push button 71' is extended to align with the diaphragm member 21 through the actuation channel 501'. The manual plunger arm 72' has an enlarged pressing end extended to bias against the push button 71' and an opposed pusher end extended towards the diaphragm shaft 22 through the actuation channel 501' in such a manner that when the push button 71' is manually pressed, the manual plunger arm 72' is directly pushed towards the diaphragm shaft 22'. The automated plunger arm 62' has a hollow structure defining a sliding channel 621' that the manual plunger arm 72' is slidably extended through the sliding channel 621'.

Therefore, the manual actuation unit 70' of the second embodiment has the same configuration of the first embodiment, except that the manual plunger arm 72' of the second embodiment is extended to the diaphragm shaft 22' while the manual plunger arm 72 of the first embodiment is extended to the pushing platform 311.

As shown in FIG. 8, the mounting element 52' having a ring shape defines two mounting openings to mount at the valve body 10' and the actuation housing 50' respectively to align the actuation channel 501'.

The power charging arrangement 40' of the second embodiment, having the same configuration of the first embodiment, comprises an electrical generator 41' operatively linked to the power source 611' and a propeller unit 42' extended from the electrical generator 41' to the water outlet 12' of the valve body 10 in such a manner that when the propeller unit 42' is driven to rotate in responsive to a flush of water coming out at the water outlet 12', the electrical generator 41' is actuated to charge the power source 611'. Accordingly, the power charging arrangement 40' can be an integrated device internally built-in with the housing body 51'.

The electrical generator 41' is an alternator or a DC generator. The propeller unit 42' comprises a propeller shaft 421' transversely extended along the actuation channel 501' and a propeller blade 422' coupled at a free end of the propeller shaft 421' at the water outlet 12' such that the propeller blade 422' is driven to be rotated in responsive to a flush of water so as to transmit a rotational power to the electrical generator 41' through the propeller shaft 421'.

It is worth to mention that the power charging arrangement 40, 40' can be incorporated with any conventional automated flush apparatus having a rechargeable power supply. Therefore, the user does not require frequently replacing the power supply or running any electrical cable to the power supply in order to installation the conventional automated flush apparatus.

Figure 11:
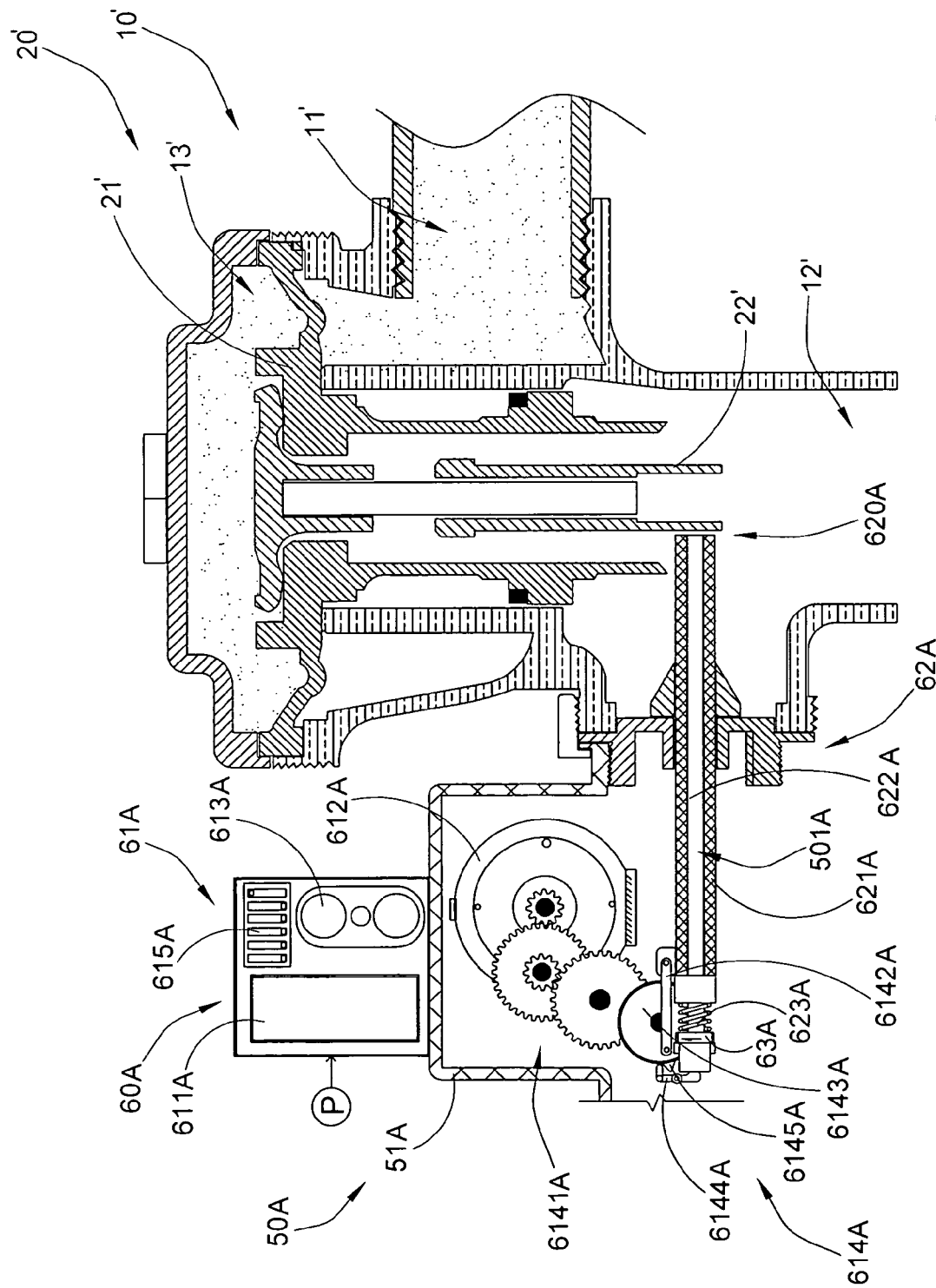
FIG. 11 is a sectional view of a flush apparatus with a driving mechanism according to a third preferred embodiment of the present invention.
Figure 12:
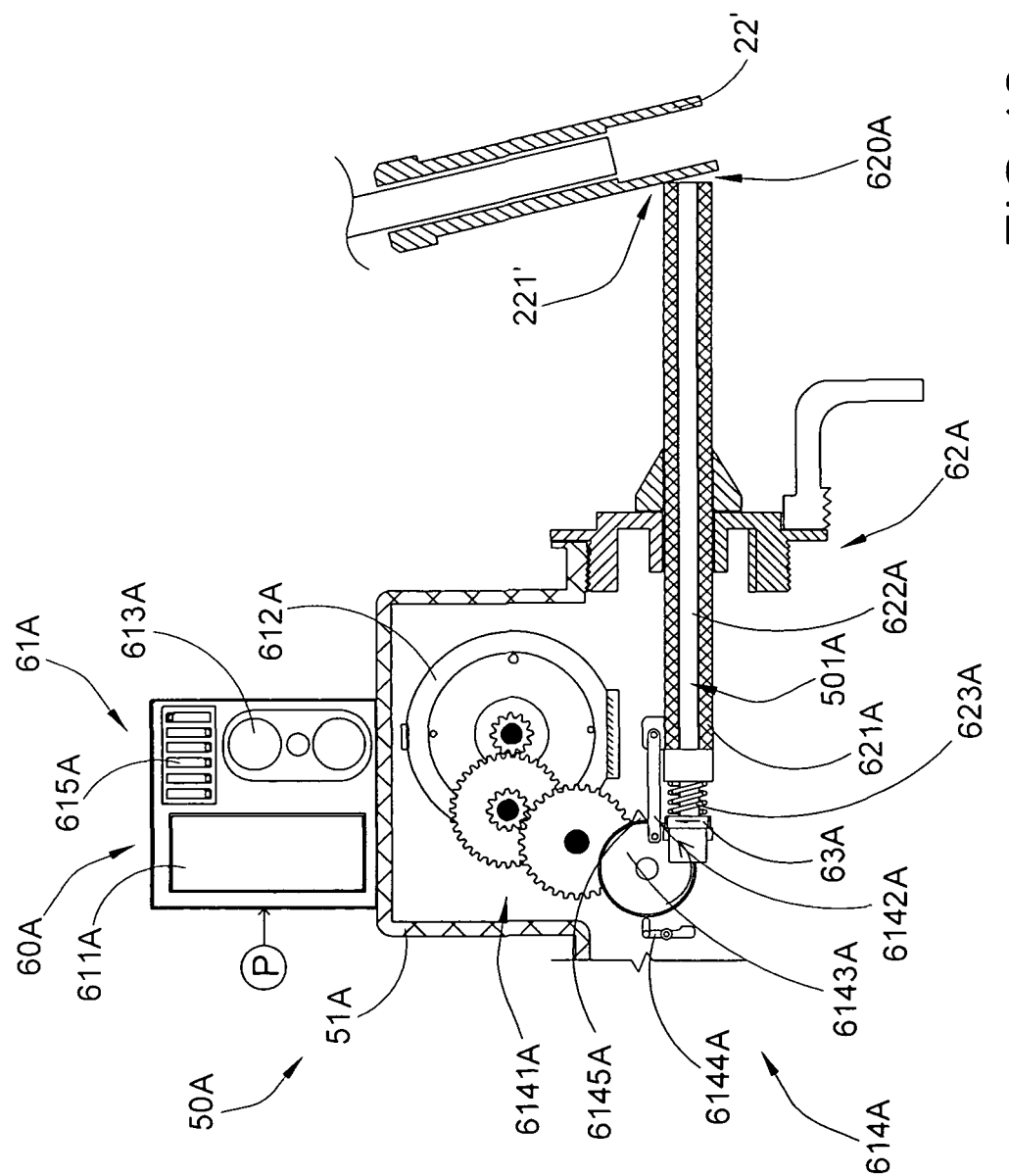
FIG. 12 illustrates the first pusher member being actuated toward the first position of the diaphragm shaft according to the above third preferred embodiment of the present invention.
Figure 13:
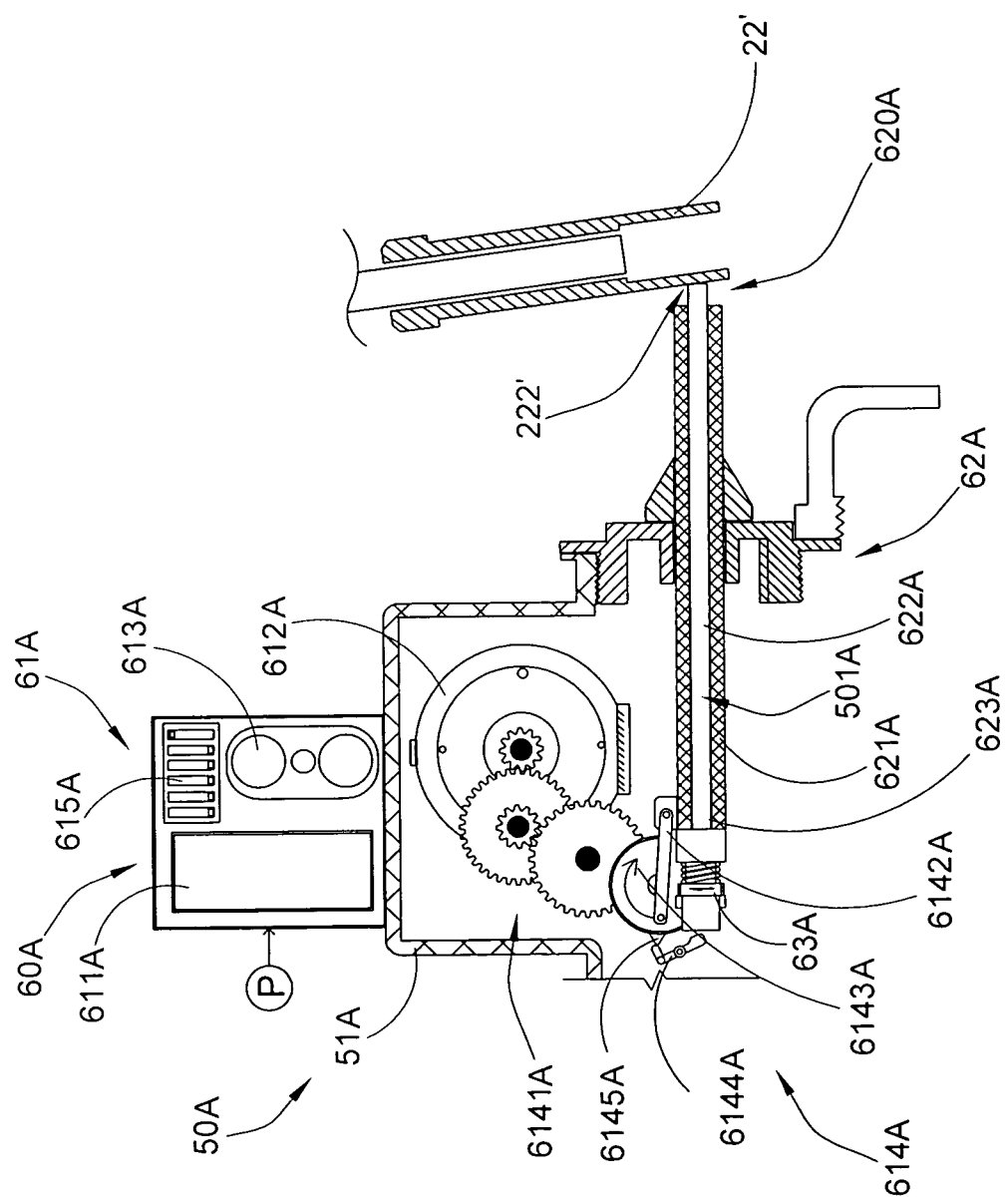
FIG. 13 illustrates the second pusher member being actuated toward the second position of the diaphragm shaft according to the above third preferred embodiment of the present invention.

Referring to FIGS. 11 to 13 of the drawings, a flush apparatus of a third embodiment illustrates another alternative of the second embodiments, wherein the flush apparatus of the third preferred embodiment has the same configuration except the driving mechanism shown in the second embodiment. According to the third embodiment, the driving mechanism comprises an actuation housing 50A and an actuation unit.

The actuation housing 50A, having an actuation channel 501A, is supported by the valve body 10'. Accordingly, the actuation housing 50A is mounted at the valve body 10' at a position that the actuation housing 50A is positioned adjacent to the valve body 10'. As shown in FIG. 11, the actuation housing 50A comprises a housing body 51A defining the actuation channel 501A at a bottom portion thereof and a tubular mounting element 52A mounting at the valve body 10' to align the actuation channel 501A with the diaphragm shaft 22'. Accordingly, the actuation channel 501' is transversely extended to communicate with the bottom portion of the diaphragm shaft 22'. In other words, the driving mechanism is adapted to incorporate with the valve body 10' which is the conventional manual flush apparatus, by removing the manual handle from the retention ring 32.

The actuation unit is received in the housing body 51A at a position above the actuation channel 501A, wherein the actuation unit comprises a motorized unit 61A received in the housing body 51A of the actuation housing 50A and a plunger arm 62A transversely extended along the actuation channel 501A.

Accordingly, the plunger arm 62A has a pushing end 620A selectively adjusted for pointing at one of first and second positions 221', 222' of the diaphragm shaft 22'. When the motorized unit 61A is activated in responsive to a presence of a user, the plunger arm 62A is driven by the motorized unit 61A for moving towards one of the first and second positions 221', 222' of the diaphragm shaft 22' so as to complete a flushing operation of the flush apparatus. In other words, the diaphragm shaft 22' is pushed by the plunger arm 62A at one of the first and second positions 221', 222' of the diaphragm shaft 22' to move the diaphragm member 21' at the unsealed position. Accordingly, the diaphragm member 21' is then moved back to its sealed position. It is worth mentioning that the pushing end 620A of the plunger arm 62A does not touch the diaphragm shaft 22' at the idle state. Therefore, the plunger arm 62A is moved by the motorized unit 61A to hit the diaphragm shaft 22' at one of the first and second positions 221', 222' thereof.

As shown in FIGS. 11 to 13, the plunger arm 62A comprises a first pusher member 621A and a second pusher member 622A and defines the pushing end 620A at a forward free end of each of the first and second pushers members 621A, 622A. Accordingly, the first and second pusher members 621A, 622A are supported side-by side and are driven to move by the motorized unit 61A. In particular, the first pusher member 621A, having a tubular structure, defines an elongated sliding channel therewithin, wherein the second pusher member 622A is slidably received at the sliding channel of the first pusher member 621A, as shown in FIG. 11.

According to the third embodiment, the driving mechanism can be formed as a flush water volume control arrangement for controlling flush water volume during a flushing operation. Accordingly, the first pusher member 621A is supported transversely for moving toward the first position 221' of the diaphragm shaft 22' to complete the flushing operation with a relatively high volume of water, as shown in FIG. 12. The second pusher member 622A is supported transversely for moving toward the second position 222' of the diaphragm shaft 22' to complete the flushing operation with a relatively low volume of water, as shown in FIG. 13.

In other words, the pushing end 620A of the first pusher member 621A is higher than the pushing end 620A of the second pusher member 622A such that the first position 221' of the diaphragm shaft 22' being pushed by the first pusher member 621A is positioned higher than the second position 222' of the diaphragm shaft 22' being pushed by the second pusher member 622'.

It is worth to mention that the operations of the first and second pusher members 621A, 622A are the same to complete the flushing operation of the flush system. In order to precisely control the volume of the water to complete the flushing operation, the time period of the water valve 20' being stayed at the flushing position should be concerned. In other words, the longer time of the water valve 20' being stayed at the flushing position, the relatively higher volume of water is used for completing the flushing operation. Therefore, the shorter time of the water valve 20' being stayed at the flushing position, the relatively lower volume of water is used for completing the flushing operation.

Accordingly, the time period of the diaphragm member 21' of the water valve 20' being stayed at the flushing position can be controlled by the time of the diaphragm shaft 22' being actuated to move back to its vertical orientation. In other words, when the diaphragm shaft 22' is moved back to its vertical orientation, the diaphragm member 21' of the water valve 20' is sealed back at its idle sealed position to block the water flushing out of the water outlet 12'.

In other words, when the first pusher member 621A is driven to move the diaphragm shaft 22' at the first position 221', the diaphragm shaft 22' requires longer time to return back to its vertical orientation. When the second pusher member 622A is driven to move the diaphragm shaft 22' at the second position 222', the diaphragm shaft 22' requires shorter time to return back to its vertical orientation. Therefore, by actuating one of the first and second pusher members 621A, 622A, the time period of the diaphragm shaft 22' returning back to its vertical orientation can be controlled so as to control the volume of water for completing the flushing operation.

As shown in FIG. 11, the motorized unit 61A comprises a power source 611A, a servo unit 612A electrically coupled with the power source 611A, a sensor 613A controllably activating the servo unit 612A in responsive to a presence of the user, and a gear transmission unit 614A coupling the servo unit 612A with the plunger arm 62A to transmit a servo power from the servo unit 612A to a transverse force at the automated plunger arm 62' so as to drive the automated plunger arm 62' towards the diaphragm shaft 22.

According to the third embodiment, the power source 611A is a rechargeable battery supported in the housing body 51A.

The servo unit 612A comprises an electric motor electrically connected to the power source 611A. The servo unit 612A is arranged for generating a first rotational power and an opposed second rotational power, wherein when the first rotational power is generated, the plunger arm 62A is driven for moving toward the first position 221' of the diaphragm shaft 22', and when the second rotational power is generated, the plunger arm 62A is driven for moving toward the second position 222' of the diaphragm shaft 22'.

In particular, when the first rotational power is generated, the first pusher member 621A is actuated for moving toward the first position 221' of the diaphragm shaft 22', and when the second rotational power is generated, the second pusher member 622A is actuated for moving toward the second position 222' of the diaphragm shaft 22'.

The gear transmission unit 614A comprises a gear set 6141A coupling with an output of the servo unit 612A for transmitting the first and second rotational powers from the servo unit 612A and a driving arm 6142A driving the first pusher member 621A to laterally move in a reciprocating manner.

The gear set 6141A comprises a driving member 6143A, as an end gear, which is driven to rotate by the servo unit 612A through the gear set 6141A and is coupled to the first pusher member 621A via the driving arm 6142A to move the first pusher member 621A in a reciprocatingly movable manner. Preferably, the driving arm 6142A has two ends coupled with the driving member 6143A and the rear end of the first pusher member 621A.

The gear transmission unit 614A further comprises a pivot arm 6144A being coupled between the driving member 6143A and the second pusher member 622A, wherein when the driving member 6143A is rotated by the first rotational power, the first pusher member 621A is driven for reciprocatingly moving toward the first position 221' of the diaphragm shaft 22', and when the driving member 6143A is rotated by the second rotational power, the pivot arm 6144A is pivotally moved to push the second pusher member 622A toward the second position 222' of the diaphragm shaft 22'.

As shown in FIG. 11, the driving member 6143A has an actuating tooth 6145A arranged in such a manner that only when the driving member 6143A is rotated by the second rotational power, the actuating tooth 6145A is driven to pivotally push the pivot arm 6144A to drive the second pusher member 622A forward. In other words, when the driving member 6143A is rotated by the first rotational power, the actuating tooth 6145A will not couple with the pivot arm 6144A.

Accordingly, the pivot arm 6144A has a pivot point defined at a mid-portion thereof to form an upper pivot end and a lower pivot end, wherein when the driving member 6143A is rotated by the second rotational power, the actuating tooth 6145A is driven to pivotally push at the upper pivot end of the pivot arm 6144A. Therefore, the lower pivot end of the pivot arm 6144A is pivotally moved to push the rear end of the second pusher member 622A forward.

The plunger arm 62A further comprises a resilient element 623A coupled between the rear ends of the first and second pusher members 621A, 622A for applying a backward pushing force against the second pusher member 622A to push the second pusher member 622A backward after the second pusher member 622A is moved forward. Preferably, the resilient element 623A is a compression spring coaxially mounted at the rear portion of the second pusher member 622A to bias against the rear end of the first pusher member 621A.

The sensor 613A is an infrared sensor to detect the presence of the user by means of infrared signal. A CPU 615A is operatively connected to the sensor 613A to receive the signal therefrom, wherein the servo unit 612A is controlled by the CPU 615A such that once the CPU 615A receives the signal from the sensor 613A, the CPU 615A will activate the servo unit 612A to drive the plunger arm 62A for completing the automatic operation. It is worth to mention that the CPU 615A can also be programmed to the time period of the presence of the user via the sensor 613A and to control the flush volume of the water via the actuation unit by means of the time period of the opening of the diaphragm member 21' at the unsealed position.

Accordingly, the first and second pusher members 621A, 622A can be actuated by the sensor 613A. For example, the first pusher member 621A can be actuated by the sensor 613A when the sensor 613A detects the presence of the user. The second pusher member 622A can be actuated by the sensor 613A when the sensor 613A detects a touch by the user. In other words, the sensor 613A can be a touch activation switch that by sensing a touch of the user, the sensor 613A will be activated. In addition, the CPU 615A can determine the usage time of the user when the sensor 613A detects the presence of the user. For example, the CPU 615A will determine the time period between a first and second signal being sent by the sensor 613A, wherein when the sensor 613A detects the presence of the user, the sensor 613A will send the first signal to the CPU 615A. Once the user leaves the flush system, i.e. there is no presence of the user within the detecting area of the sensor 613A, the sensor 613A will send the second signal to the CPU 615A. When the time period is shorter than a predetermined threshold, such as 2 minutes, the CPU 615A will activate the servo unit 612A to actuate the second pusher member 622A. When the time period is longer than the predetermined threshold, the CPU 615A will activate the servo unit 612A to actuate the first pusher member 621A. In other words, the servo unit 612A will automatically actuate two different settings to complete the flushing operating operation. The first setting is arranged to control the flushing operation for completing the flushing operation with a relatively high volume of water. The second setting is arranged to control the flushing operation for completing the flushing operation with a relatively low volume of water.

Preferably, a gauge 63A is provided at the rear end of the second pusher member 622A to measure the displacement thereof to ensure the second pusher member 622A being moved back to its initial position.

As shown in FIG. 11, the driving member 6143A is set at an initial position that the actuating tooth 6145A is located below the upper pivot end of the pivot arm 6144A. In order to actuate the first pusher member 621A, the driving member 6143A will be powered by first rotational power to rotate at one direction, for example rotating at a counterclockwise direction. Then, the driving arm 6142A will transmit the rotational force of the driving member 6143A to a transverse moving force to push the first pusher member 621A forward, as shown in FIG. 12. It is worth mentioning that the driving member 6143A is rotated 180° at a counterclockwise direction such that the first pusher member 621A is pushed forward while the actuating tooth 6145A does not engage with the upper pivot end of the pivot arm 6144A. When the driving member 6143A is kept rotating, the actuating tooth 6145A will be driven to move to its initial position. Therefore, the driving member 6143A will apply the transverse moving force to pull the first pusher member 621A backward. In other words, the first pusher member 621A will be driven to move in a reciprocatingly movable manner via the driving arm 6142A.

It is worth mentioning that the driving member 6143A is kept rotating at the counterclockwise direction until the driving member 6143A is rotated back to its initial position. In addition, the upper end of the pivot end of the pivot arm 6144A will be actuated by the actuating tooth 6145A only when the driving member 6143A is rotated at the clockwise direction. It is appreciated that the driving member 6143A can be configured to be rotated back to its initial position at the clockwise direction to pull the first pusher member 621A backward.

In addition, when the first pusher member 621A is reciprocatingly moved, the second pusher member 622A is correspondingly moved. In other words, the first and second pusher member 621A, 622A will be driven to move reciprocatingly at the same time.

In order to actuate the second pusher member 622A, the driving member 6143A will be powered by second rotational power to rotate at an opposed direction, for example rotating at the clockwise direction, as shown in FIG. 13. The actuating tooth 6145A will engage with the upper pivot end of the pivot arm 6144A to pivotally fold the lower pivot end thereof forward. Therefore, the lower pivot end of the pivot arm 6144A will push the second pusher member 622A forward. At the same time, the resilient element 623A will be compressed between the rear ends of the first and second pusher members 621A, 622A. It is worth mentioning that the first pusher member 621A is remained stationary. Then, when the driving member 6143A is rotated back to its initial position, i.e. rotating at counterclockwise direction, the actuating tooth 6145A will disengage with the upper pivot end of the pivot arm 6144A. The resilient element 623A will restore to its original configuration to pull the second pusher member 622A back to its initial position.

It is worth mentioning that the rotating angle of the driving member 6143A is about 15° in order to drive the actuating tooth 6145A engaging with the upper pivot end of the pivot arm 6144A. Having such relatively small rotating angle, the first pusher member 621A is considered as stationary.

Accordingly, the diaphragm member 21' is normally sealed at the water chamber 13' between the water inlet 11' and the water outlet 12', wherein the diaphragm shaft 22' is downwardly extended from the diaphragm member 21'. When the diaphragm shaft 22' is moved by the pushing end 620A of the plunger arm 62', the diaphragm member 21' will be moved from the sealed position to the unsealed position to allow the water passing from the water inlet 11' to the water outlet 12', thereby flushing the flush system.

Figure 14:
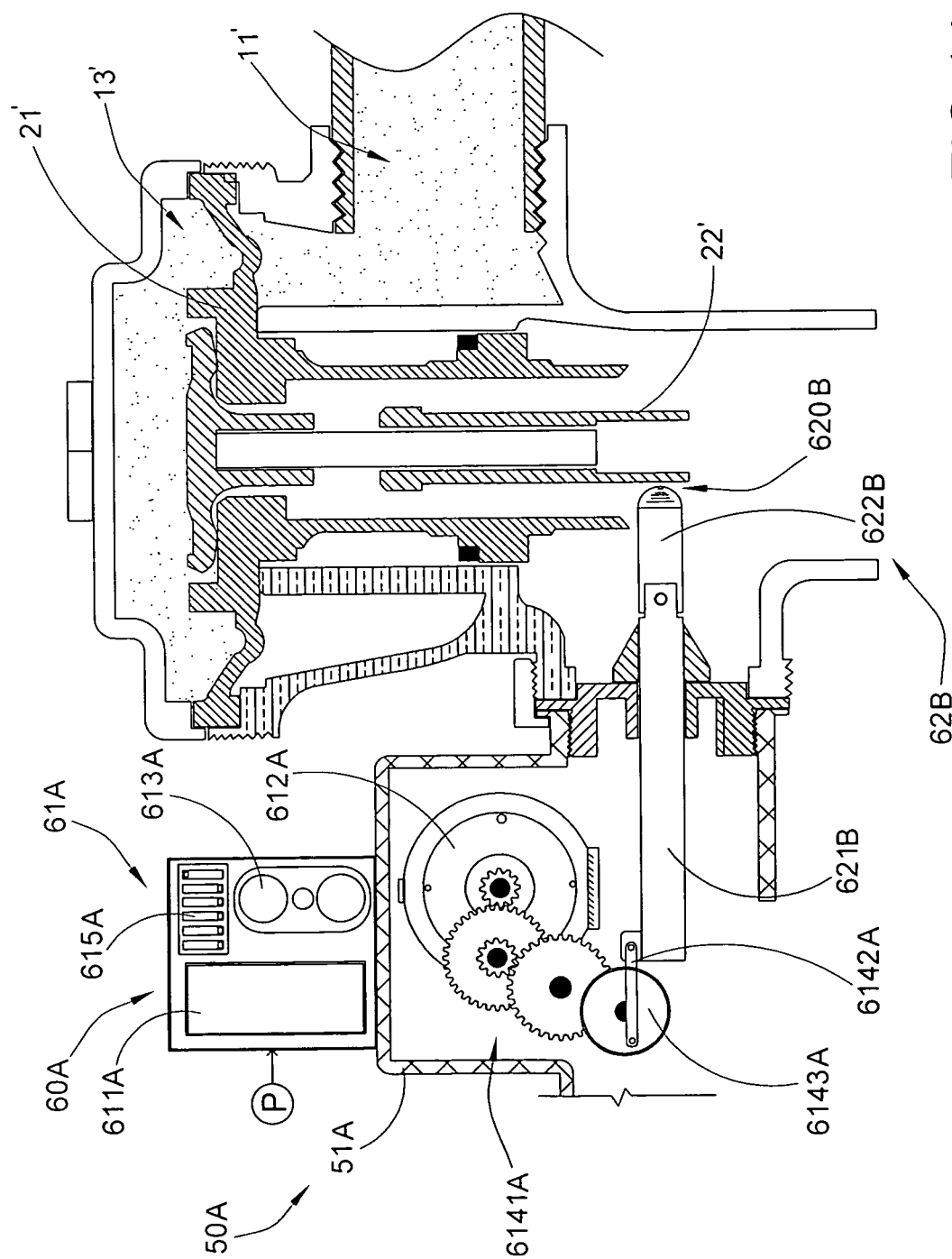
FIG. 14 is a sectional view of a flush apparatus with a driving mechanism according to a fourth preferred embodiment of the present invention.
Figure 15:
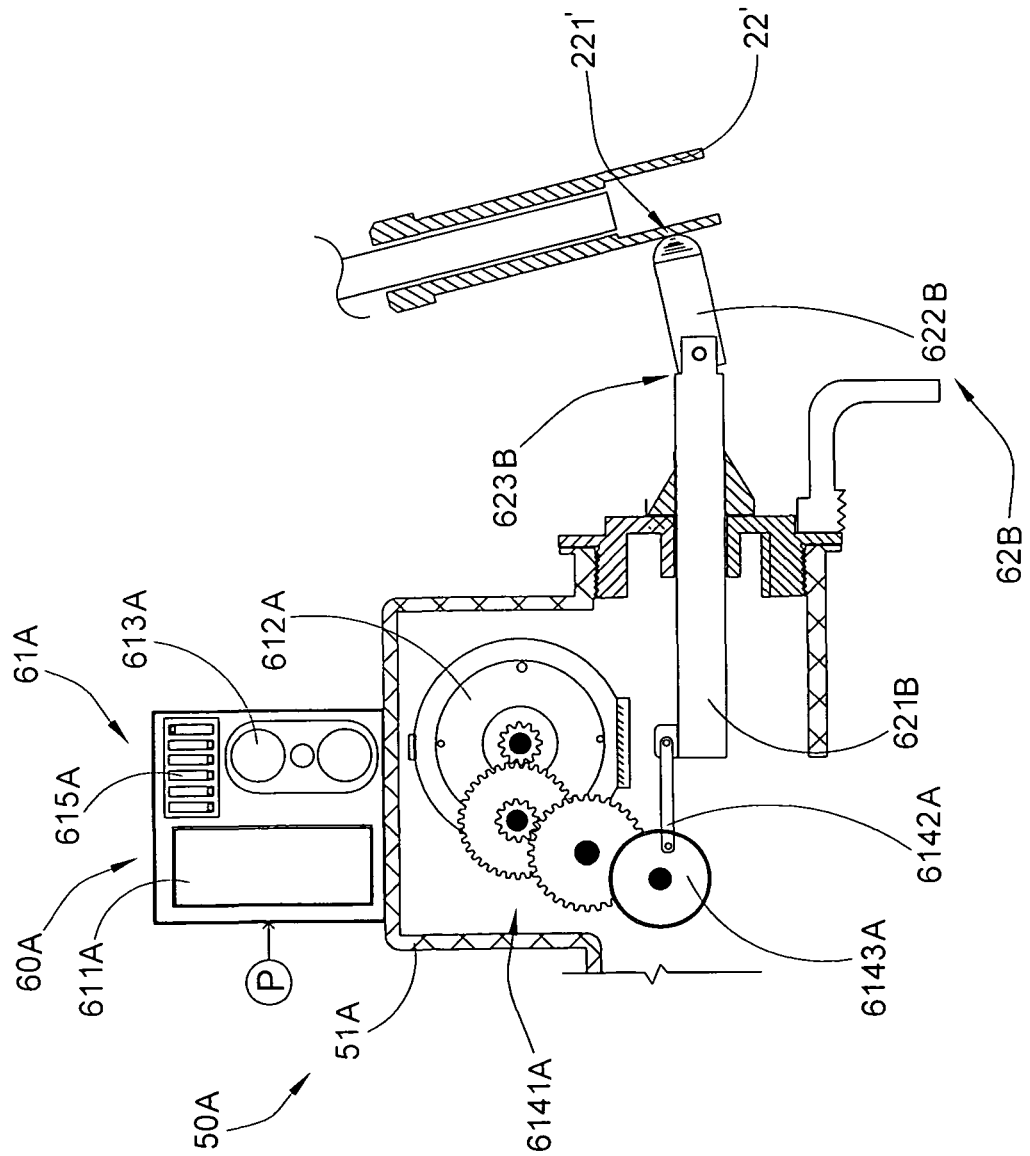
FIG. 15 illustrates the pusher member being upwardly folded toward the first position of the diaphragm shaft according to the above fourth preferred embodiment of the present invention.
Figure 16:
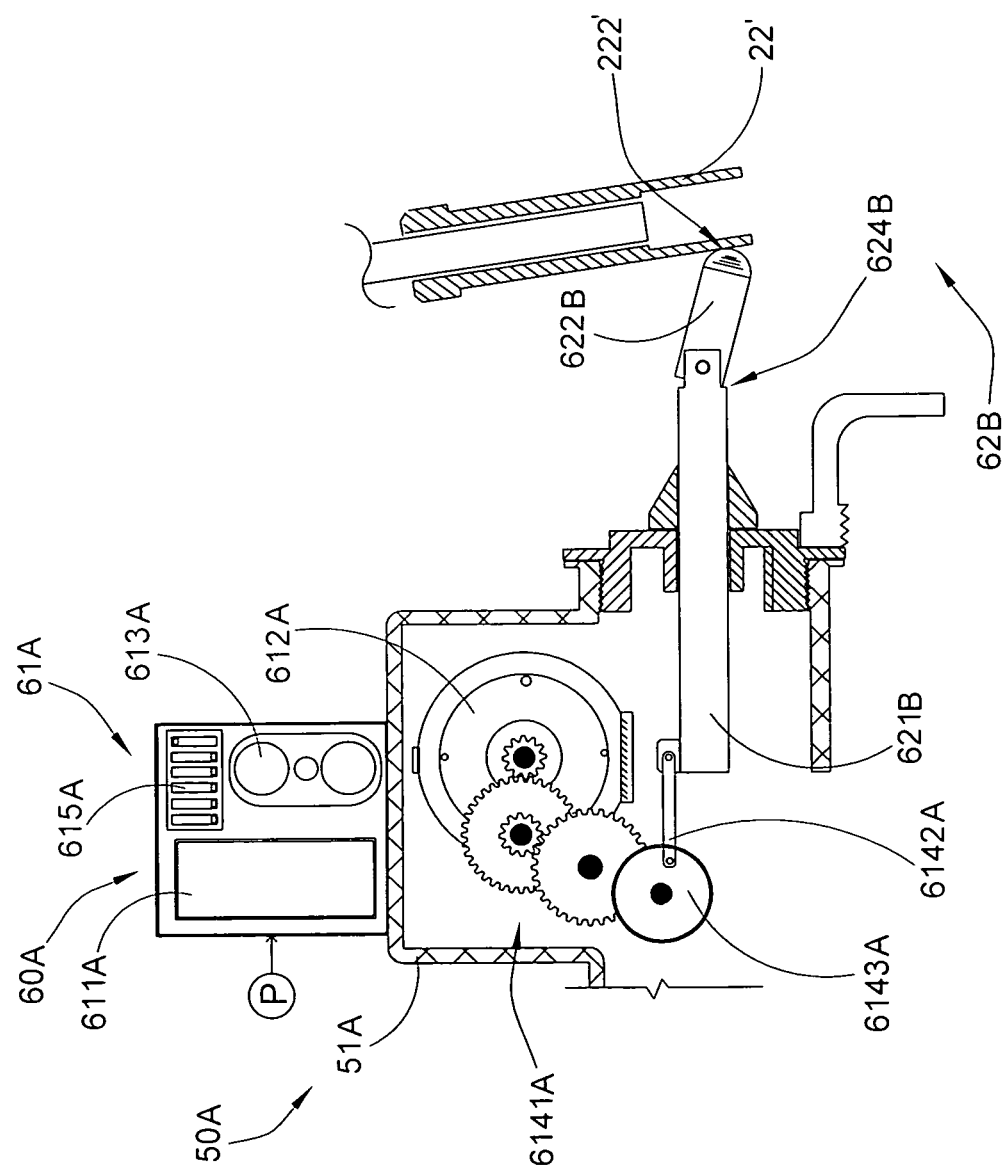
FIG. 16 illustrates the pusher member being downwardly folded toward the second position of the diaphragm shaft according to the above fourth preferred embodiment of the present invention.

As shown in FIG. 14, an alternative mode of the plunger arm 62B illustrates an alternative mode of the third embodiment for moving towards one of the first and second positions 221', 222' of the diaphragm shaft 22' so as to complete a flushing operation of the flush apparatus. As shown in FIG. 14, the plunger arm 62B is transversely extended along the actuation channel 501A, wherein the plunger arm 62B comprises a plunger body 621B being driven by the motorized unit 61A and a pusher member 622B pivotally coupled with the plunger body 61B end-to-end and defined the pushing end 620B at the pusher member 622B. When the pusher member 622B is pivotally and upwardly moved, as shown in FIG. 15, the plunger body 621B is transversely moved for driving the pusher member 622B toward the first position 221' of the diaphragm shaft 22' to complete said flushing operation with a relatively high volume of water. When the pusher member 622B is pivotally and downwardly moved, as shown in FIG. 16, the plunger body 621B is transversely moved for driving the pusher member 622B toward the second position 222' of the diaphragm shaft 22' to complete the flushing operation with a relatively low volume of water. Accordingly, the first position 221' of the diaphragm shaft 22' is positioned higher than the second position 222' of the diaphragm shaft 22'.

The driving arm 6142A is coupled between the gear set 6141A of the gear transmission unit 614A and the plunger body 621B to drive the plunger body 621B to laterally move in a reciprocating manner.

The driving member 6143A is driven to rotate by the servo unit 612A through the gear set 6141A and is coupled to the plunger body 621B via the driving arm 6142A to move the plunger body 621B in a reciprocatingly movable manner. Preferably, the driving arm 6142A has two ends coupled with the driving member 6143A and the rear end of the plunger body 621B.

As it is mentioned above, in order to actuate the plunger arm 62B, the driving member 6143A will be powered by rotational power of the servo unit 612A to rotate. Then, the driving arm 6142A will transmit the rotational force of the driving member 6143A to a transverse moving force to push the plunger arm 62B forward. When the driving member 6143A is kept rotating, the driving member 6143A will apply the transverse moving force to pull the plunger arm 62B backward. In other words, the plunger arm 62B will be driven to move in a reciprocatingly movable manner via the driving arm 6142A. Therefore, by pivotally moving the pusher member 622B with respect to the plunger body 621B, two or more different settings can be configured to complete the flushing operating operation. The first setting is arranged to control the flushing operation for completing the flushing operation with a relatively high volume of water. The second setting is arranged to control the flushing operation for completing the flushing operation with a relatively low volume of water.

As shown in FIGS. 15 and 16, the plunger body 621B has an upper blocking surface 623B and a lower blocking surface 624B to limit a pivotally folding angle of the pusher member 622B. Accordingly, when the pusher member 622B is folded upwardly, the upper blocking surface 623B of the plunger body 621B will block the further upwardly pivot movement of the plunger body 621B. Likewise, when the pusher member 622B is folded downwardly, the lower blocking surface 624B of the plunger body 621B will block the further downwardly pivot movement of the plunger body 621B.

Furthermore, the pushing end 620B of the plunger arm 62B has a round shape for enhancing a contacting area between the plunger arm 62B and the diaphragm shaft 22' when the pusher member 622B is pivotally moved.

Figure 17:
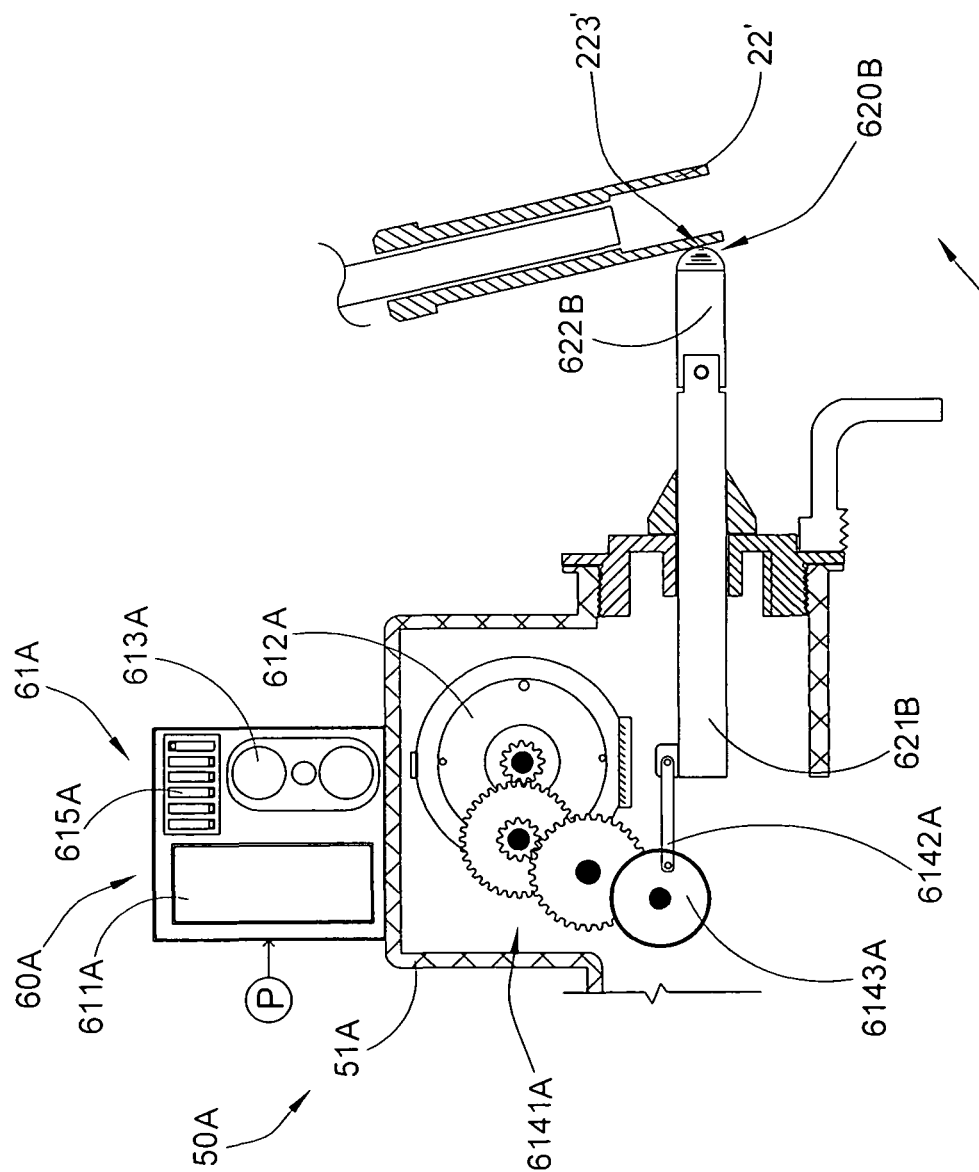
FIG. 17 illustrates the pusher member extended toward the third position of the diaphragm shaft according to the above fourth preferred embodiment of the present invention.

It is appreciated that the pusher member 622B can further be selectively adjusted between the upper pivotal folded position and the lower pivotally folded position. In other words, the pusher member 622B can be folded to align with the plunger body 621B that the pushing end 620B of the plunger arm 62B extends toward a third position 223' of the diaphragm shaft 22', wherein the third position 223' of the diaphragm shaft 22' is located between the first and second positions 221', 222' thereof, as shown in FIG. 17. Therefore, the flushing operation will be completed with a relatively volume of water at the third position 223' of the diaphragm shaft 22' more than the volume of water at the second position 222' and lesser than the volume of water at the first position 221'.

Figure 18:
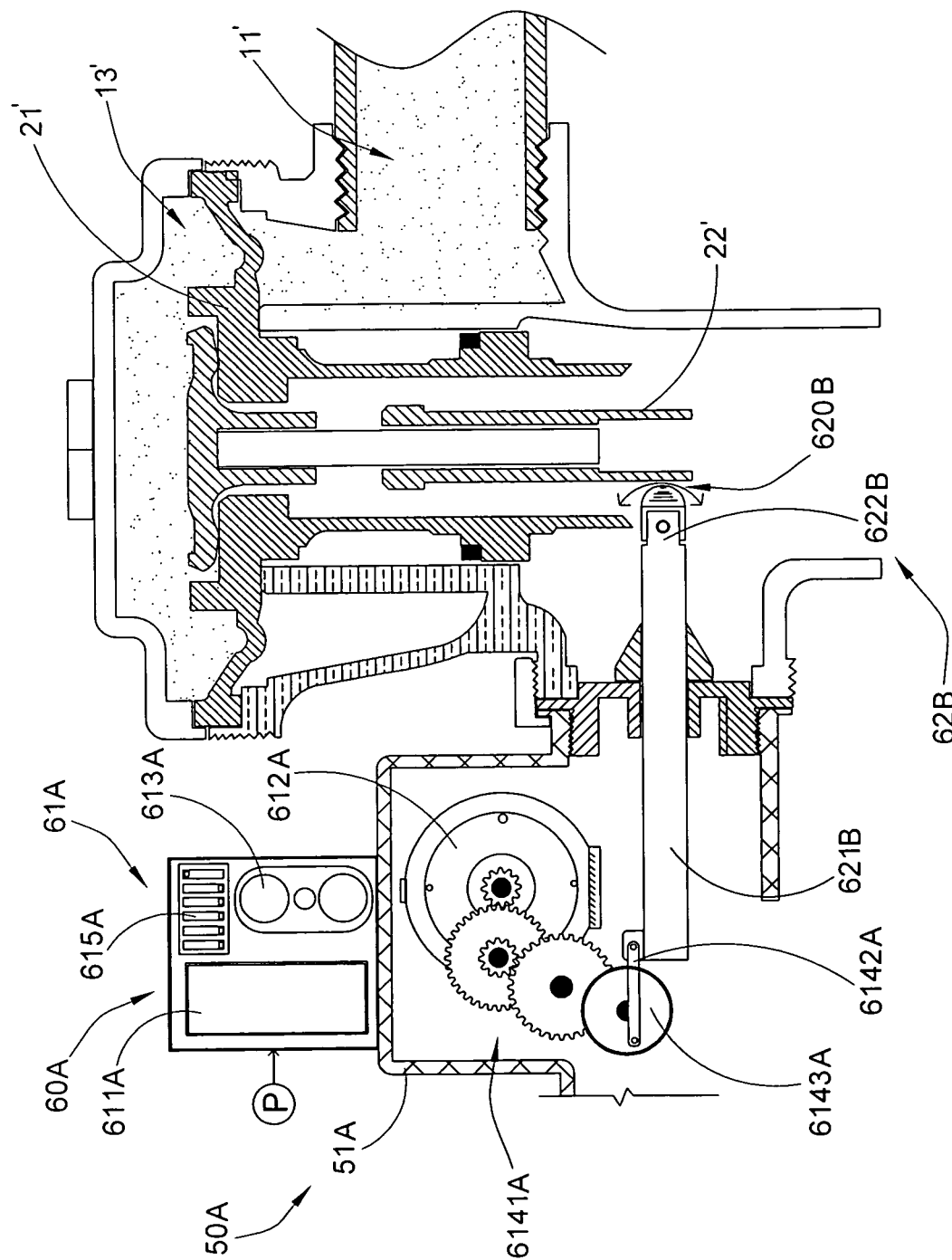
FIG. 18 illustrates an alternative mode of the pusher member of the driving mechanism according to the above fourth preferred embodiment of the present invention

It is also appreciated that the length of the pusher member 622B can be substantially shortened that the pusher member 622B forms a head portion of the plunger arm 62B as shown in FIG. 18, wherein the head portion of the plunger arm 62B can be pivotally folded up and down to selectively adjust the volume of water being used for completing the flushing operation of the flush system.

One skilled in the art will understand that the embodiment of the present invention as shown in the drawings and described above is exemplary only and not intended to be limiting.

It will thus be seen that the objects of the present invention have been fully and effectively accomplished. The above embodiments are shown and described for the purposes of illustrating the functional and structural principles of the present invention and is subject to change without departure from such principles. Therefore, this invention includes all modifications encompassed within the spirit and scope of the following claims.

What is claimed is:

1. A driving mechanism for a flush apparatus which comprises a valve body having an operation opening, and a diaphragm member normally being retained at a sealed position, and a diaphragm shaft for moving said diaphragm member from said sealed position to an unsealed position, wherein said driving mechanism comprises:

a motorized unit adapted for being supported by said valve body; and a plunger arm which is driven by said motorized unit and is transversely extended toward said diaphragm shaft, wherein said plunger arm has a pushing end at a free end of said plunger arm that said free end of said plunger arm is selectively adjusted for pointing at one of first and second positions of said diaphragm shaft, such that when said motorized unit is activated in responsive to a presence of a user, said plunger arm is driven by said motorized unit for moving towards one of said first and second positions of said diaphragm shaft so as to complete a flushing operation of said flush apparatus, wherein said plunger arm comprises a plunger body being driven by said motorized unit and a pusher member pivotally coupled with said plunger body end-to-end and defining said pushing end at a free end of said pusher member, wherein when said pusher member is pivotally and upwardly moved, said plunger body is transversely moved for driving said pusher member toward said first position of said diaphragm shaft to complete said flushing operation with a relatively high volume of water, and when said pusher member is pivotally and downwardly moved, said plunger body is transversely moved for driving said pusher member toward said second position of said diaphragm shaft to complete said flushing operation with a relatively low volume of water, wherein said plunger body comprises a centrally aligned longitudinal axis, an upper blocking surface and a lower blocking surface to limit a pivotally folding angle of said pusher member, said pusher member pivoting within a longitudinal plane substantially along the longitudinal axis and pivoting about an origin of said pivotally folding angle, the origin at an endpoint of the plunger body and located at an unrestrained end of the plunger body, endpoint on the centrally aligned longitudinal axis, the pivotally folding angle defining a pivoting range between the upper and lower blocking surfaces, wherein the pusher member free end may be positioned within the longitudinal plane for engaging the diaphragm shaft.

* * * * *